US012071729B2

(12) United States Patent
Polat et al.

(10) Patent No.: US 12,071,729 B2
(45) **Date of Patent: *Aug. 27, 2024**

(54) FIBROUS STRUCTURES

(71) Applicant: The Procter & Gamble Company, Cincinnati, OH (US)

(72) Inventors: Osman Polat, Montgomery, OH (US); Charles Allen Redd, Harrison, OH (US); Kathryn Christian Kien, Cincinnati, OH (US); Anthony Paul Bankemper, Green Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,765

(22) Filed: Jun. 28, 2023

(65) Prior Publication Data

US 2023/0340732 A1 Oct. 26, 2023

Related U.S. Application Data

(63) Continuation of application No. 17/853,980, filed on Jun. 30, 2022, now Pat. No. 11,732,420, which is a (Continued)

(51) Int. Cl.
*D21H 27/02* (2006.01)
*B31F 1/07* (2006.01)
(Continued)

(52) U.S. Cl.
CPC ................ *D21H 27/02* (2013.01); *B31F 1/07* (2013.01); *D10B 2401/00* (2013.01); *D21F 11/006* (2013.01); *D21H 27/002* (2013.01)

(58) Field of Classification Search
CPC .... D21H 27/02; D21H 27/002; D21H 27/005; D21H 27/004; D21H 5/02; D21H 27/007;
(Continued)

(56) References Cited

U.S. PATENT DOCUMENTS

D3,406 S 3/1869 Button
182,816 A 10/1876 Gardner
(Continued)

FOREIGN PATENT DOCUMENTS

CA 40677 A 10/1892
CA 45803 A 4/1894
(Continued)

OTHER PUBLICATIONS

All Office Actions, U.S. Appl. No. 14/642,856, filed Mar. 10, 2015.
(Continued)

*Primary Examiner* — Jose A Fortuna
(74) *Attorney, Agent, or Firm* — Richard L. Alexander; Andrew J. Mueller

(57) ABSTRACT

A fibrous structure may include a plurality of wetformed knuckles or pillows, where the wet-formed knuckles or pillows of the pattern may form a plurality of rows oriented in an X-direction and/or a Y-direction, and the plurality of rows may be curved in a repeating wave pattern, where the repeating wave pattern may have an amplitude and a wavelength, and wherein the amplitude may be between about 0.75 mm and about 3.0 mm, and the wavelength may be between about 25.0 mm and about 125.0 mm.

19 Claims, 12 Drawing Sheets

Related U.S. Application Data continuation of application No. 16/708,571, filed on Dec. 10, 2019, now Pat. No. 11,408,129.

(60) Provisional application No. 62/777,286, filed on Dec. 10, 2018.

(51) Int. Cl.
*D21H 27/00* (2006.01)
*D21F 11/00* (2006.01)

(58) Field of Classification Search
CPC .. B31F 1/07; B31F 2201/0733; D21F 11/006; A47K 10/16; D10B 2401/00; Y10T 428/24479
See application file for complete search history.

(56) References Cited

U.S. PATENT DOCUMENTS

| | | | |
|---|---|---|---|
| 207,397 | A | 8/1878 | Davies |
| D30,628 | S | 4/1899 | Norman et al. |
| D36,460 | S | 7/1903 | Henry |
| D38,211 | S | 8/1906 | French |
| D58,840 | S | 8/1921 | Thompson |
| D71,546 | S | 11/1926 | Day |
| D88,182 | S | 11/1932 | Weitz |
| D89,078 | S | 1/1933 | Grtjlich |
| D96,576 | S | 8/1935 | Haywood |
| D103,858 | S | 3/1937 | Minoff |
| D116,385 | S | 8/1939 | Sigoda |
| 2,443,170 | A | 6/1948 | Smith |
| D175,222 | S | 7/1955 | Holt |
| D176,223 | S | 11/1955 | Mccord |
| D177,059 | S | 3/1956 | Mccord |
| 3,239,065 | A | 3/1966 | Hunt |
| 3,301,746 | A | 1/1967 | Sanford et al. |
| 3,323,983 | A | 6/1967 | Palmer et al. |
| 3,414,459 | A | 12/1968 | Ronald |
| 3,473,576 | A | 10/1969 | Amneus |
| 3,556,932 | A | 1/1971 | Coscia et al. |
| 3,556,933 | A | 1/1971 | Williams et al. |
| 3,573,164 | A | 3/1971 | Friedberg et al. |
| 3,672,950 | A | 6/1972 | Murphy et al. |
| 3,684,641 | A | 8/1972 | Murphy |
| 3,700,623 | A | 10/1972 | Keim |
| 3,772,076 | A | 11/1973 | Keim |
| 3,788,934 | A | 1/1974 | Coppa |
| 3,812,000 | A | 5/1974 | Salvucci, Jr. et al. |
| 3,817,827 | A | 6/1974 | Benz |
| 3,821,068 | A | 6/1974 | Shaw |
| 3,905,863 | A | 9/1975 | Ayers |
| 3,974,025 | A | 8/1976 | Ayers |
| 3,994,771 | A | 11/1976 | Morgan, Jr. et al. |
| 4,011,389 | A | 3/1977 | Langdon |
| 4,191,609 | A | 3/1980 | Trokhan |
| 4,191,756 | A | 3/1980 | Arcamone et al. |
| 4,208,459 | A | 6/1980 | Becker et al. |
| 4,239,065 | A | 12/1980 | Trokhan |
| 4,300,981 | A | 11/1981 | Carstens |
| 4,320,162 | A | 3/1982 | Schulz |
| 4,367,859 | A | 1/1983 | Lamon |
| D268,961 | S | 5/1983 | Erickson |
| 4,391,878 | A | 7/1983 | Drach |
| 4,440,597 | A | 4/1984 | Wells et al. |
| 4,514,345 | A | 4/1985 | Johnson et al. |
| 4,528,239 | A | 7/1985 | Trokhan |
| 4,529,480 | A | 7/1985 | Trokhan |
| 4,557,801 | A | 12/1985 | Avis |
| 4,637,859 | A | 1/1987 | Trokhan |
| D298,702 | S | 11/1988 | Drew |
| 4,894,726 | A | 1/1990 | Steinhardt et al. |
| 4,919,756 | A | 4/1990 | Sawdai |
| D314,673 | S | 2/1991 | Legare |
| 5,059,282 | A | 10/1991 | Ampulski et al. |
| 5,098,522 | A | 3/1992 | Smurkoski et al. |
| 5,164,046 | A | 11/1992 | Ampulski et al. |
| 5,179,448 | A | 1/1993 | Steinhardt et al. |
| 5,221,435 | A | 6/1993 | Smith, Jr. |
| 5,245,025 | A | 9/1993 | Trokhan et al. |
| 5,246,545 | A | 9/1993 | Ampulski et al. |
| 5,246,546 | A | 9/1993 | Ampulski |
| 5,260,171 | A | 11/1993 | Smurkoski et al. |
| 5,275,700 | A | 1/1994 | Trokhan |
| 5,277,761 | A | 1/1994 | Phan et al. |
| 5,294,475 | A | 3/1994 | Mcneil |
| 5,328,565 | A | 7/1994 | Rasch et al. |
| 5,334,289 | A | 8/1994 | Trokhan |
| 5,364,504 | A | 11/1994 | Smurkoski et al. |
| 5,411,636 | A | 5/1995 | Hermans et al. |
| 5,415,918 | A | 5/1995 | Lang et al. |
| 5,431,786 | A | 7/1995 | Rasch et al. |
| 5,436,057 | A | 7/1995 | Schulz et al. |
| 5,443,691 | A | 8/1995 | Phan et al. |
| D363,610 | S | 10/1995 | Saffran et al. |
| 5,468,323 | A | 11/1995 | Mcneil |
| 5,496,624 | A | 3/1996 | Stelljes, Jr. et al. |
| 5,500,277 | A | 3/1996 | Trokhan et al. |
| 5,514,523 | A | 5/1996 | Trokhan |
| 5,527,428 | A | 6/1996 | Trokhan et al. |
| 5,549,790 | A | 8/1996 | Van Phan |
| 5,552,345 | A | 9/1996 | Schrantz et al. |
| 5,554,467 | A | 9/1996 | Trokhan et al. |
| 5,556,509 | A | 9/1996 | Trokhan et al. |
| 5,566,724 | A | 10/1996 | Trokhan et al. |
| 5,580,423 | A | 12/1996 | Ampulski |
| 5,609,725 | A | 3/1997 | Van Phan |
| 5,624,790 | A | 4/1997 | Trokhan et al. |
| 5,628,876 | A | 5/1997 | Ayers et al. |
| 5,629,052 | A | 5/1997 | Trokhan et al. |
| 5,637,194 | A | 6/1997 | Ampulski et al. |
| 5,654,076 | A | 8/1997 | Trokhan et al. |
| 5,656,132 | A | 8/1997 | Farrington, Jr. et al. |
| 5,674,663 | A | 10/1997 | Mcfarland et al. |
| 5,679,222 | A | 10/1997 | Rasch et al. |
| 5,693,406 | A | 12/1997 | Wegele et al. |
| 5,709,775 | A | 1/1998 | Trokhan et al. |
| 5,714,041 | A | 2/1998 | Ayers et al. |
| 5,716,692 | A | 2/1998 | Warner |
| 5,728,268 | A | 3/1998 | Weisman et al. |
| 5,795,440 | A | 8/1998 | Ampulski et al. |
| 5,804,281 | A | 9/1998 | Phan et al. |
| 5,820,730 | A | 10/1998 | Phan et al. |
| 5,830,558 | A | 11/1998 | Barnholtz |
| 5,840,403 | A | 11/1998 | Trokhan et al. |
| 5,840,411 | A | 11/1998 | Stelljes, Jr. et al. |
| 5,843,270 | A | 12/1998 | Buergin |
| 5,855,739 | A | 1/1999 | Ampulski et al. |
| 5,858,554 | A | 1/1999 | Neal et al. |
| D405,270 | S | 2/1999 | Burden |
| D405,271 | S | 2/1999 | Unwin et al. |
| 5,865,950 | A | 2/1999 | Vinson et al. |
| D407,225 | S | 3/1999 | Dwiggins et al. |
| D409,389 | S | 5/1999 | Sporing et al. |
| 5,900,122 | A | 5/1999 | Huston |
| 5,906,710 | A | 5/1999 | Trokhan |
| 5,906,711 | A | 5/1999 | Barnholtz |
| D411,369 | S | 6/1999 | Dwiggins et al. |
| 5,919,556 | A | 7/1999 | Barnholtz |
| 5,935,381 | A | 8/1999 | Trokhan et al. |
| 5,938,893 | A | 8/1999 | Trokhan et al. |
| 5,942,085 | A | 8/1999 | Neal et al. |
| 5,948,210 | A | 9/1999 | Huston |
| D417,962 | S | 12/1999 | Funk et al. |
| D420,808 | S | 2/2000 | Dwiggins et al. |
| 6,030,690 | A | 2/2000 | Mcneil et al. |
| 6,039,839 | A | 3/2000 | Trokhan et al. |
| D422,150 | S | 4/2000 | Enderby |
| D423,232 | S | 4/2000 | Reid |
| 6,048,938 | A | 4/2000 | Neal et al. |
| D426,303 | S | 6/2000 | Weyenberg |
| D426,388 | S | 6/2000 | Durben et al. |
| D426,709 | S | 6/2000 | Latchoo et al. |
| D426,888 | S | 6/2000 | Ilian |
| D427,778 | S | 7/2000 | Durben et al. |

(56) References Cited

U.S. PATENT DOCUMENTS

| | | | |
|---|---|---|---|
| 6,086,715 | A | 7/2000 | Mcneil |
| 6,106,670 | A | 8/2000 | Weisman et al. |
| 6,113,723 | A | 9/2000 | Mcneil et al. |
| 6,117,525 | A | 9/2000 | Trokhan et al. |
| 6,136,146 | A | 10/2000 | Phan et al. |
| 6,139,686 | A | 10/2000 | Trokhan et al. |
| D433,572 | S | 11/2000 | Bissah et al. |
| D433,820 | S | 11/2000 | Haarer et al. |
| D434,913 | S | 12/2000 | Schmidt et al. |
| 6,165,319 | A | 12/2000 | Heath et al. |
| D436,739 | S | 1/2001 | Jahner et al. |
| 6,171,447 | B1 | 1/2001 | Trokhan |
| D438,017 | S | 2/2001 | Reid |
| 6,187,138 | B1 | 2/2001 | Neal |
| 6,193,839 | B1 | 2/2001 | Ampulski |
| 6,193,847 | B1 | 2/2001 | Trokhan |
| D438,958 | S | 3/2001 | Velazquez et al. |
| D438,960 | S | 3/2001 | Velazquez et al. |
| D438,961 | S | 3/2001 | Velazquez et al. |
| D438,963 | S | 3/2001 | Velazquez et al. |
| 6,200,419 | B1 | 3/2001 | Phan |
| 6,238,682 | B1 | 5/2001 | Klofta |
| 6,277,466 | B1 | 8/2001 | Mcneil et al. |
| D448,078 | S | 9/2001 | Deoliveira et al. |
| D448,478 | S | 9/2001 | Deoliveira et al. |
| D449,453 | S | 10/2001 | Duritsch et al. |
| D449,935 | S | 11/2001 | Cohen et al. |
| D449,936 | S | 11/2001 | Cohen et al. |
| D450,191 | S | 11/2001 | Cohen et al. |
| D450,934 | S | 11/2001 | Duritsch et al. |
| 6,348,131 | B1 | 2/2002 | Kershaw et al. |
| 6,358,594 | B1 | 3/2002 | Ampulski |
| D462,180 | S | 9/2002 | Kao et al. |
| D463,137 | S | 9/2002 | Monroe et al. |
| 6,447,642 | B1 | 9/2002 | Phan et al. |
| D472,056 | S | 3/2003 | Jahner |
| 6,540,880 | B1 | 4/2003 | Trokhan et al. |
| 6,547,928 | B2 | 4/2003 | Barnholtz et al. |
| 6,548,447 | B1 | 4/2003 | Yokoyama et al. |
| 6,551,453 | B2 | 4/2003 | Weisman et al. |
| D475,206 | S | 6/2003 | Ackerman et al. |
| D476,161 | S | 6/2003 | Salway et al. |
| 6,602,577 | B1 | 8/2003 | Ostendorf et al. |
| 6,610,173 | B1 | 8/2003 | Lindsay et al. |
| D482,784 | S | 11/2003 | Babusik |
| 6,660,129 | B1 | 12/2003 | Cabell et al. |
| 6,673,202 | B2 | 1/2004 | Burazin |
| 6,675,429 | B2 | 1/2004 | Carter et al. |
| 6,706,152 | B2 | 3/2004 | Burazin |
| D488,810 | S | 4/2004 | Lin et al. |
| 6,746,570 | B2 | 6/2004 | Burazin |
| 6,746,766 | B2 | 6/2004 | Bond |
| 6,749,719 | B2 | 6/2004 | Burazin |
| D493,622 | S | 8/2004 | Hynnek et al. |
| 6,787,000 | B2 | 9/2004 | Burazin |
| 6,797,114 | B2 | 9/2004 | Hu |
| 6,802,937 | B2 | 10/2004 | Johnston |
| 6,821,385 | B2 | 11/2004 | Burazin |
| 6,821,386 | B2 | 11/2004 | Weisman et al. |
| D504,236 | S | 4/2005 | Olson et al. |
| 6,890,872 | B2 | 5/2005 | Bond |
| D506,071 | S | 6/2005 | Delaney |
| D507,117 | S | 7/2005 | Delaney |
| 6,946,506 | B2 | 9/2005 | Bond |
| 6,998,017 | B2 | 2/2006 | Lindsay et al. |
| D518,298 | S | 4/2006 | Hynnek et al. |
| 7,022,395 | B2 | 4/2006 | Ackerman et al. |
| D519,739 | S | 5/2006 | Schuh et al. |
| D520,249 | S | 5/2006 | Hasenoehrl |
| D520,754 | S | 5/2006 | Hasenoehrl |
| D526,129 | S | 8/2006 | Delaney |
| 7,128,809 | B2 | 10/2006 | Vinson et al. |
| 7,169,458 | B2 | 1/2007 | Underhill et al. |
| D541,052 | S | 4/2007 | Miller et al. |
| D544,215 | S | 6/2007 | Enderby |
| D550,969 | S | 9/2007 | Fung et al. |
| D550,970 | S | 9/2007 | Vidal et al. |
| D555,908 | S | 11/2007 | Johnsrud |
| 7,311,800 | B2 | 12/2007 | Russell et al. |
| 7,326,322 | B2 | 2/2008 | Ruthven et al. |
| 7,419,569 | B2 | 9/2008 | Hermans |
| 7,494,563 | B2 | 2/2009 | Edwards |
| 7,494,564 | B2 | 2/2009 | Basler et al. |
| 7,527,851 | B2 | 5/2009 | Schuh et al. |
| 7,550,059 | B2 | 6/2009 | Van Phan et al. |
| 7,687,140 | B2 | 3/2010 | Manifold et al. |
| 7,691,229 | B2 | 4/2010 | Vinson et al. |
| 7,704,601 | B2 | 4/2010 | Manifold et al. |
| 7,744,723 | B2 | 6/2010 | Sheehan et al. |
| 7,807,022 | B2 | 10/2010 | Hermans |
| 7,811,665 | B2 | 10/2010 | Manifold et al. |
| D634,130 | S | 3/2011 | Coffaro et al. |
| D635,370 | S | 4/2011 | Coffaro et al. |
| D636,609 | S | 4/2011 | Coffaro et al. |
| D637,821 | S | 5/2011 | Steeman et al. |
| D638,224 | S | 5/2011 | Ko et al. |
| D638,630 | S | 5/2011 | Coffaro et al. |
| 7,939,168 | B2 | 5/2011 | Manifold et al. |
| 7,960,020 | B2 | 6/2011 | Manifold |
| 7,989,058 | B2 | 8/2011 | Manifold |
| D644,441 | S | 9/2011 | Hutchison |
| D645,258 | S | 9/2011 | Weber |
| 8,025,966 | B2 | 9/2011 | Manifold et al. |
| D646,900 | S | 10/2011 | Vitucci et al. |
| D647,310 | S | 10/2011 | Hutchison |
| 8,298,376 | B2 | 10/2012 | Polat et al. |
| 8,313,617 | B2 | 11/2012 | Polat et al. |
| 8,911,850 | B2 | 12/2014 | Kien et al. |
| 9,315,945 | B2 | 4/2016 | Maladen et al. |
| 9,617,684 | B2 | 4/2017 | Maladen et al. |
| 10,132,042 | B2 | 11/2018 | Maladen et al. |
| 10,458,069 | B2 | 10/2019 | Maladen et al. |
| 10,472,771 | B2 | 11/2019 | Maladen et al. |
| 10,610,063 | B2 | 4/2020 | Vogt et al. |
| 10,711,402 | B2 | 7/2020 | Bailey et al. |
| 10,822,745 | B2 | 11/2020 | Maladen et al. |
| 11,408,129 | B2 * | 8/2022 | Polat ...................... D21H 27/02 |
| 11,725,346 | B2 | 8/2023 | Maladen et al. |
| 11,732,420 | B2 * | 8/2023 | Polat ...................... D21H 27/02 162/109 |
| 2002/0168518 | A1 | 11/2002 | Bond |
| 2003/0072918 | A1 | 4/2003 | Andersson |
| 2003/0077444 | A1 | 4/2003 | Bond |
| 2003/0092343 | A1 | 5/2003 | Bond |
| 2003/0138597 | A1 | 7/2003 | Ruthven et al. |
| 2003/0168912 | A1 | 9/2003 | Wodrich |
| 2004/0009387 | A1 | 1/2004 | Aoki et al. |
| 2004/0023003 | A1 | 2/2004 | Basler |
| 2004/0025887 | A1 | 2/2004 | Scopton |
| 2004/0084167 | A1 | 5/2004 | Vinson et al. |
| 2004/0112783 | A1 | 6/2004 | Mukai |
| 2004/0126570 | A1 | 7/2004 | Kramer et al. |
| 2004/0154767 | A1 | 8/2004 | Trokhan |
| 2004/0154768 | A1 | 8/2004 | Trokhan |
| 2004/0154769 | A1 | 8/2004 | Lorenz |
| 2004/0157524 | A1 | 8/2004 | Polat |
| 2004/0191486 | A1 | 9/2004 | Underhill et al. |
| 2004/0192136 | A1 | 9/2004 | Gusky |
| 2004/0258886 | A1 | 12/2004 | Maciag |
| 2004/0261639 | A1 | 12/2004 | Vaughn |
| 2005/0026529 | A1 | 2/2005 | Bond |
| 2005/0045293 | A1 | 3/2005 | Hermans |
| 2005/0061356 | A1 | 3/2005 | Wong et al. |
| 2005/0067126 | A1 | 3/2005 | Horenziak |
| 2005/0079785 | A1 | 4/2005 | Bond |
| 2005/0178513 | A1 | 8/2005 | Russell |
| 2005/0201965 | A1 | 9/2005 | Kuhlman |
| 2006/0266484 | A1 | 11/2006 | Vinson et al. |
| 2007/0062568 | A1 | 3/2007 | Harbaugh |
| 2007/0122595 | A1 | 5/2007 | Basler et al. |
| 2007/0137814 | A1 | 6/2007 | Gao |
| 2007/0232178 | A1 | 10/2007 | Polat et al. |
| 2007/0272381 | A1 | 11/2007 | Elony et al. |
| 2008/0041543 | A1 | 2/2008 | Dyer |

(56) References Cited

U.S. PATENT DOCUMENTS

| | | | |
|---|---|---|---|
| 2008/0260996 A1 | 10/2008 | Heilman | |
| 2008/0271863 A1 | 11/2008 | Zoller et al. | |
| 2008/0294140 A1 | 11/2008 | Ecker et al. | |
| 2009/0056891 A1 | 3/2009 | Wiwi et al. | |
| 2009/0220741 A1 | 9/2009 | Manifold | |
| 2009/0220769 A1 | 9/2009 | Manifold | |
| 2009/0297775 A1 | 12/2009 | Spitzer et al. | |
| 2010/0129681 A1 | 5/2010 | Coderre | |
| 2010/0186913 A1 | 7/2010 | Super et al. | |
| 2010/0294446 A1 | 11/2010 | Manifold | |
| 2010/0297395 A1 | 11/2010 | Mellin et al. | |
| 2011/0027563 A1 | 2/2011 | Manifold | |
| 2011/0104970 A1 | 5/2011 | Barnholtz et al. | |
| 2011/0183132 A1 | 7/2011 | Manifold | |
| 2011/0189435 A1 | 8/2011 | Manifold | |
| 2011/0189436 A1 | 8/2011 | Manifold | |
| 2011/0189442 A1 | 8/2011 | Manifold | |
| 2011/0189443 A1 | 8/2011 | Manifold | |
| 2011/0189451 A1 | 8/2011 | Manifold | |
| 2011/0206913 A1 | 8/2011 | Manifold | |
| 2011/0253329 A1 | 10/2011 | Manifold | |
| 2011/0265967 A1 | 11/2011 | Phan et al. | |
| 2011/0305884 A1 | 12/2011 | Manifold | |
| 2012/0043036 A1 | 2/2012 | Polat et al. | |
| 2012/0043041 A1 | 2/2012 | Polat et al. | |
| 2012/0043042 A1 | 2/2012 | Polat et al. | |
| 2012/0104373 A1 | 5/2012 | Inoue et al. | |
| 2012/0107568 A1 | 5/2012 | Manifold et al. | |
| 2012/0180971 A1 | 7/2012 | Polat et al. | |
| 2012/0193052 A1 | 8/2012 | Quigley | |
| 2013/0209749 A1 | 8/2013 | Myangiro et al. | |
| 2014/0138040 A1 | 5/2014 | Sartini et al. | |
| 2015/0176218 A1 | 6/2015 | Maladen et al. | |
| 2015/0247287 A1 | 9/2015 | Maladen et al. | |
| 2015/0247291 A1 | 9/2015 | Maladen et al. | |
| 2016/0230337 A1 | 8/2016 | Maladen et al. | |
| 2016/0265166 A1 | 9/2016 | Maladen et al. | |
| 2017/0284025 A1 | 10/2017 | Cabell et al. | |
| 2017/0306566 A1 | 10/2017 | Bailey et al. | |
| 2017/0328011 A1 | 11/2017 | Sealey, II et al. | |
| 2018/0298560 A1 | 10/2018 | Burazin et al. | |
| 2019/0119853 A1 | 4/2019 | Sierra et al. | |
| 2019/0360157 A1 | 11/2019 | Manifold et al. | |
| 2020/0131709 A1 | 4/2020 | Mitchell et al. | |
| 2020/0187725 A1 | 6/2020 | Vogt et al. | |
| 2021/0062432 A1 | 3/2021 | Satake Neto et al. | |
| 2021/0140114 A1 | 5/2021 | Redd et al. | |
| 2021/0140115 A1 | 5/2021 | Redd et al. | |
| 2021/0140116 A1 | 5/2021 | Redd et al. | |
| 2022/0010495 A1 | 1/2022 | Bailey et al. | |
| 2022/0341097 A1* | 10/2022 | Polat | D21H 27/02 |
| 2023/0083332 A1* | 3/2023 | Ross | D21H 27/002 162/109 |
| 2023/0340731 A1 | 10/2023 | Maladen et al. | |
| 2023/0340732 A1* | 10/2023 | Polat | D21H 27/02 |

FOREIGN PATENT DOCUMENTS

| | | | |
|---|---|---|---|
| CA | 66787 | A | 3/1900 |
| CA | 80403 | A | 4/1903 |
| CA | 84961 | A | 1/1904 |
| CA | 84963 | A | 1/1904 |
| CA | 88125 | A | 7/1904 |
| CA | 88455 | A | 7/1904 |
| CA | 88456 | A | 7/1904 |
| CA | 90931 | A | 1/1905 |
| CA | 91307 | A | 1/1905 |
| CA | 92883 | A | 5/1905 |
| CA | 94566 | A | 8/1905 |
| CA | 95529 | A | 10/1905 |
| CA | 96514 | A | 12/1905 |
| CA | 100535 | A | 8/1906 |
| CA | 2835873 | A1 | 5/2001 |
| CA | 3064406 | A1 | 6/2020 |
| EP | 0617164 | A1 | 9/1994 |
| EP | 0677612 | A2 | 10/1995 |
| EP | 1505207 | A2 | 2/2005 |
| EP | 0677612 | B2 | 6/2006 |
| EP | 1876291 | A2 | 1/2008 |
| EP | 2048283 | A1 | 4/2009 |
| FR | 2576328 | A1 | 7/1986 |
| GB | 2319539 | A | 5/1998 |
| WO | 9600812 | A1 | 1/1996 |
| WO | 9633310 | A1 | 10/1996 |
| WO | 9717494 | A1 | 5/1997 |
| WO | 9844194 | A1 | 10/1998 |
| WO | 9850481 | A1 | 11/1998 |
| WO | 9850482 | A1 | 11/1998 |
| WO | 02/061191 | A2 | 8/2002 |
| WO | 2004056560 | A1 | 7/2004 |
| WO | 2005021868 | A1 | 3/2005 |
| WO | 2005068720 | A1 | 7/2005 |
| WO | 2005080683 | A2 | 9/2005 |
| WO | 2006060814 | A2 | 6/2006 |
| WO | 2007001576 | A1 | 1/2007 |
| WO | 2007070124 | A1 | 6/2007 |
| WO | 2008051269 | A2 | 5/2008 |
| WO | 2008054269 | A1 | 5/2008 |
| WO | 2012104373 | A2 | 8/2012 |
| WO | 2016022616 | A1 | 2/2016 |
| WO | 2016022618 | A1 | 2/2016 |
| WO | 2021092282 | A1 | 5/2021 |

OTHER PUBLICATIONS

All Office Actions, U.S. Appl. No. 14/642,867, filed Mar. 10, 2015.
All Office Actions, U.S. Appl. No. 14/642,870, filed Mar. 10, 2015.
All Office Actions, U.S. Appl. No. 15/493,336, filed Apr. 21, 2017.
All Office Actions, U.S. Appl. No. 15/892,479, filed Feb. 9, 2018.
All Office Actions, U.S. Appl. No. 16/566,201, filed Sep. 10, 2019.
All Office Actions; U.S. Appl. No. 14/642,861, filed Mar. 10, 2015.
All Office Actions; U.S. Appl. No. 16/708,571, filed Dec. 10, 2019.
All Office Actions; U.S. Appl. No. 17/061,620, filed Oct. 2, 2020.
All Office Actions; U.S. Appl. No. 17/853,980, filed Jun. 30, 2022.
All Office Actions; U.S. Appl. No. 18/342,758, filed Jun. 28, 2023.
Bejan. A, "Constructal Theory of Pattern Formation", Hydrology and Earth System Sciences, vol. 11, dated Jan. 17, 2007, pp. 753-768.
Beyer. J.; Designing Tessellations: The Secrets of Interlocking Patterns, Contemporary Books, Chicago, IL, year 1999, pp. 10-30.
El-Hosseiny, et al., "Effect of Fiber Length and Coarseness of the Burst Strength of Paper", TAPPI Journal, vol. 82: No. 1(Jan. 1999), pp. 202-203.
International Search Report and Written Opinion; Application Ser. No. PCT/US2017/021470, dated May 12, 2017, 13 pages.
Smook, Gary A, Second Edition Handbook for Pulp & Paper Technologists, 1992, Angus Wilde Publications, Chapter 13, pp. 194-208.

* cited by examiner

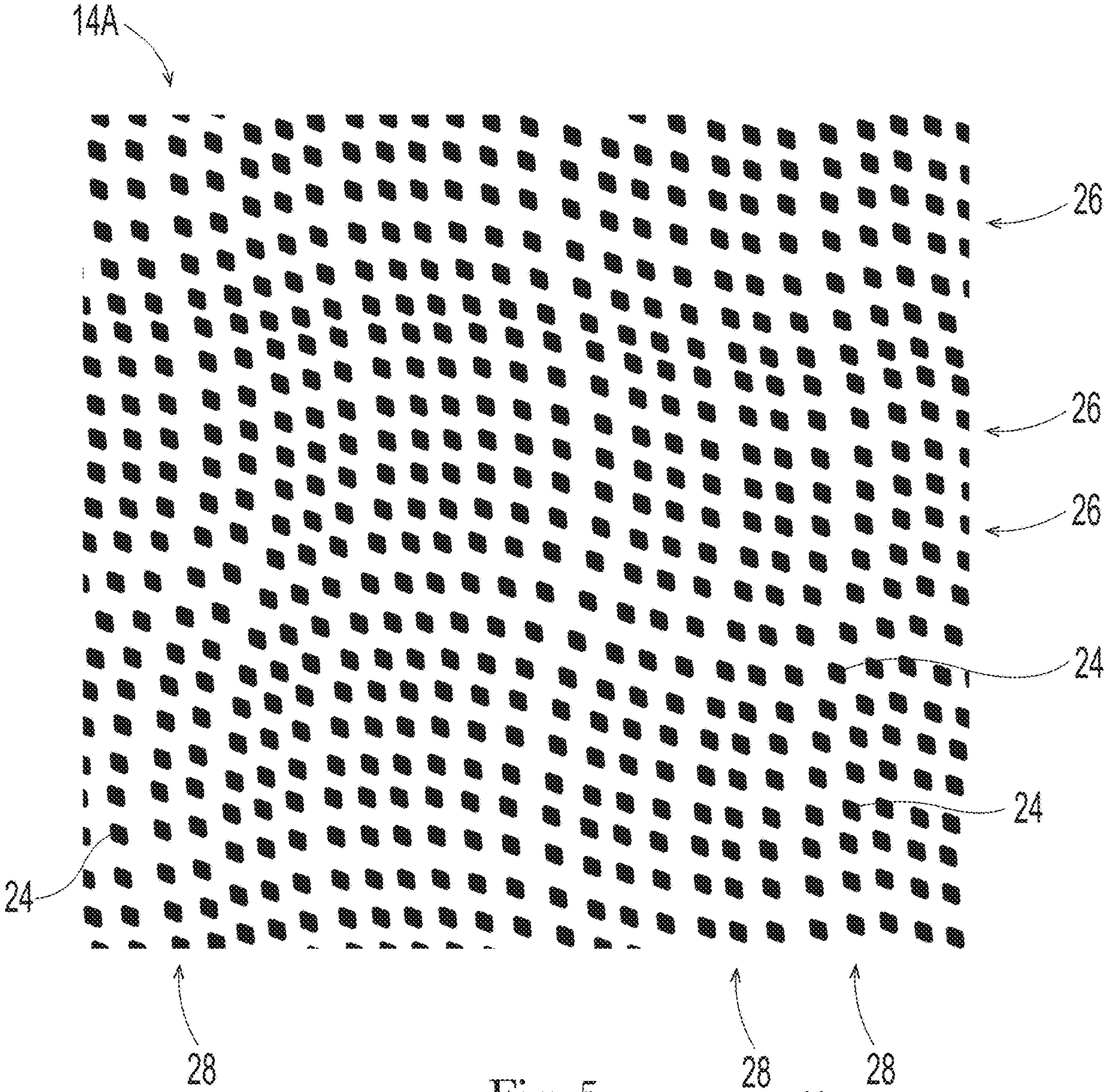
Fig. 5
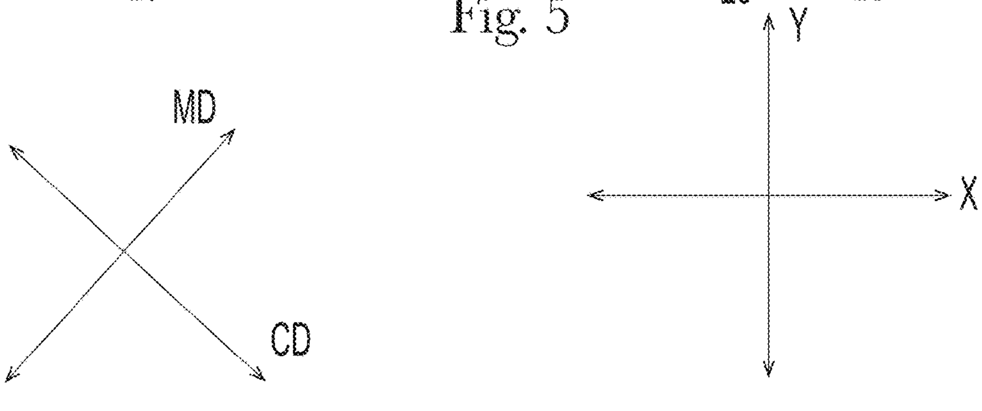

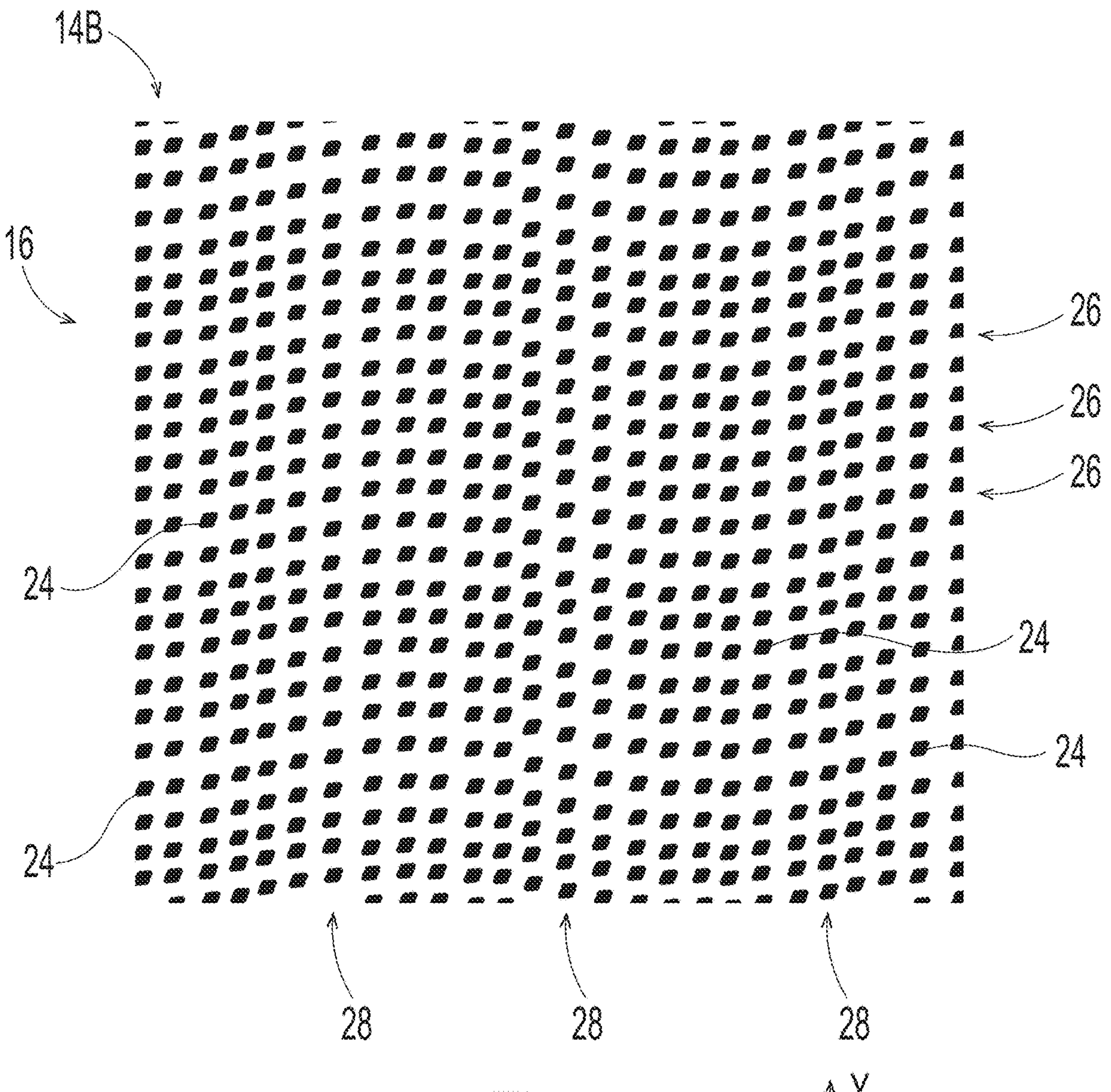
Fig. 6
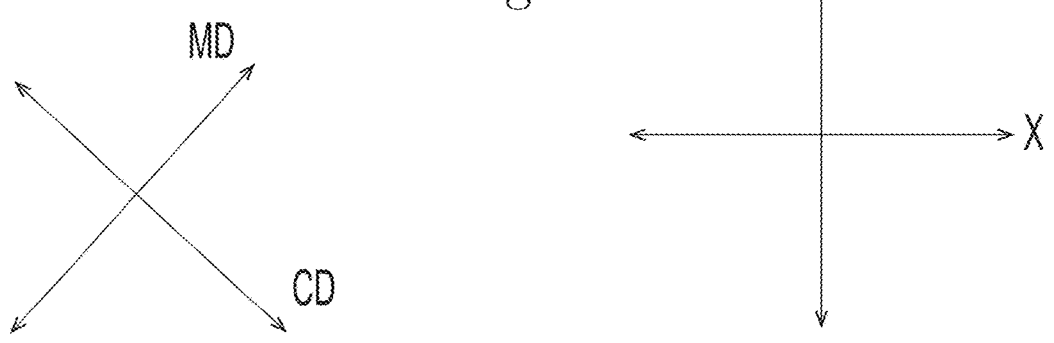

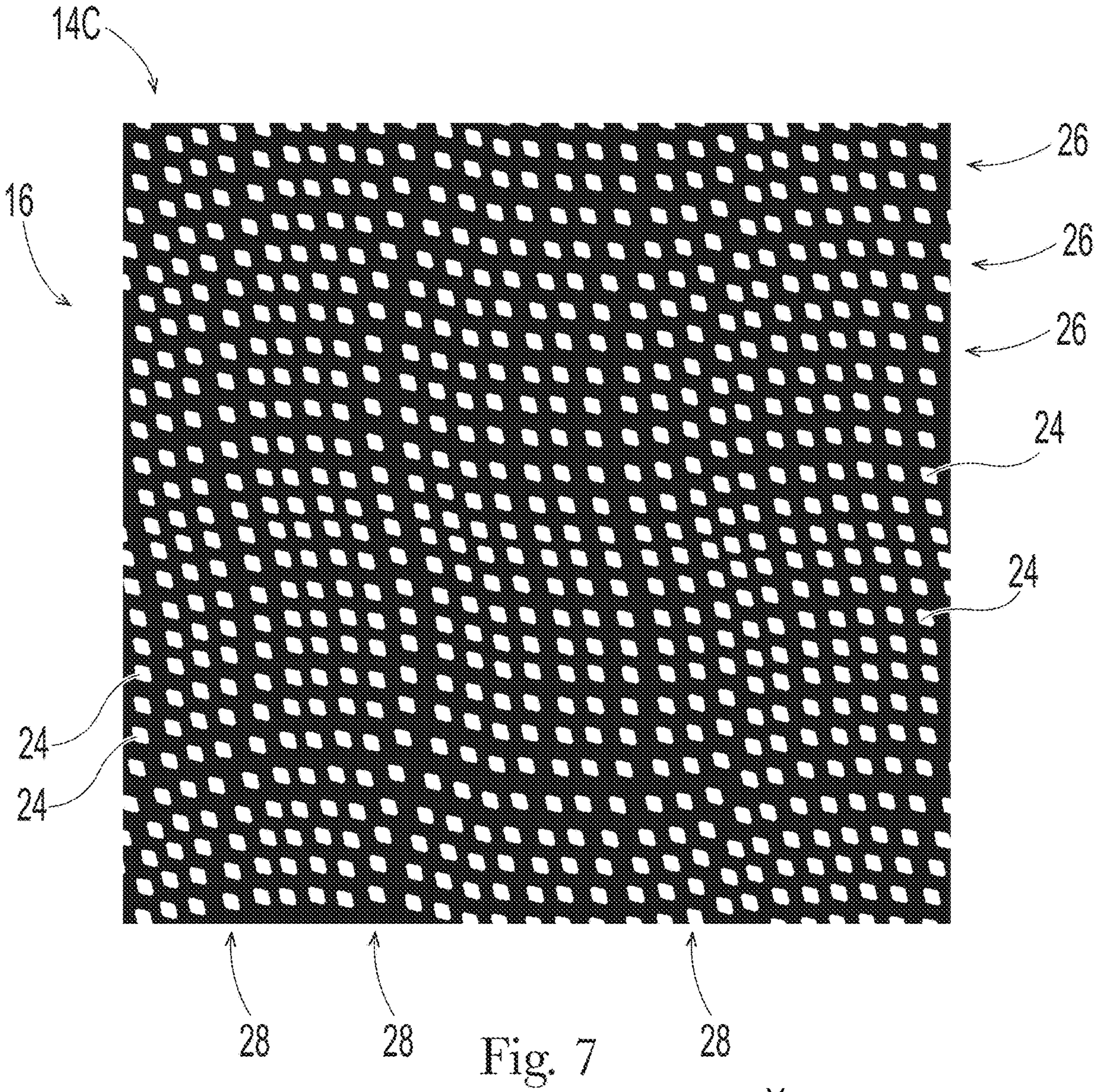
Fig. 7
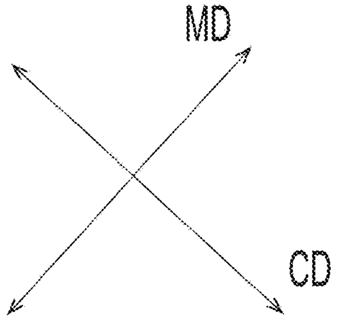
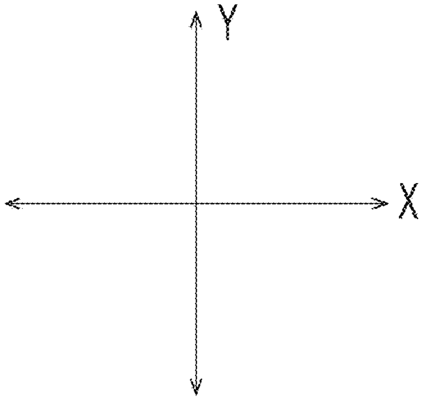

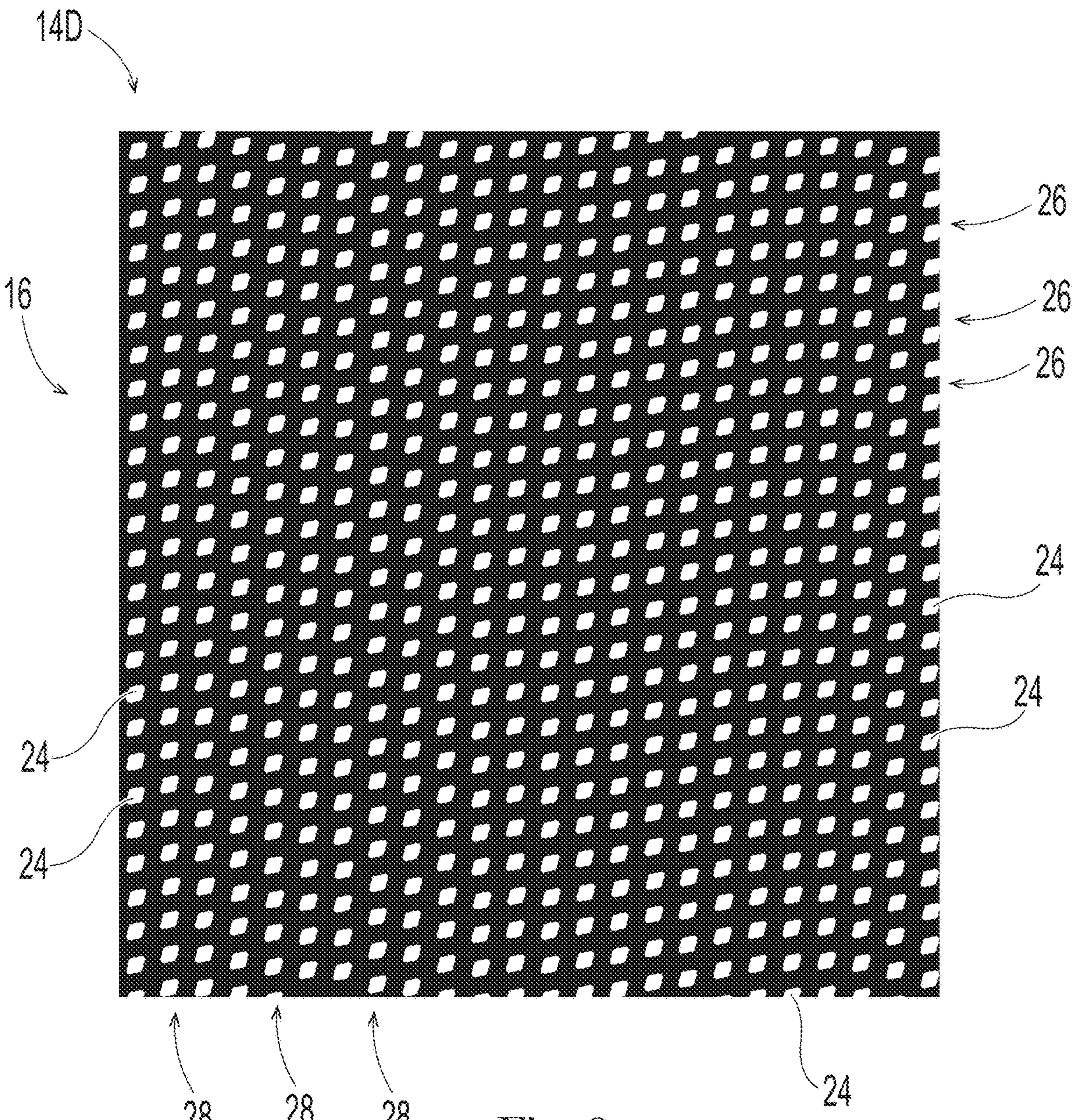
Fig. 8
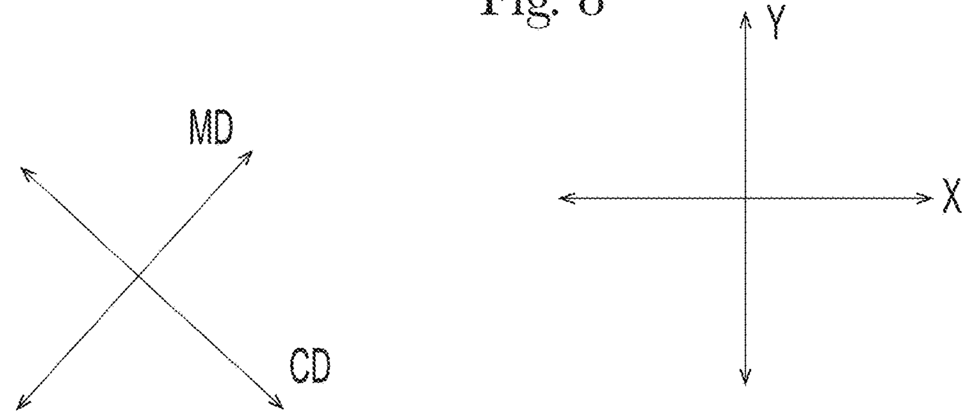

FIBROUS STRUCTURES

CROSS REFERENCE TO RELATED APPLICATIONS

This application is a continuation of, and claims priority under 35 U.S.C. § 120 to, U.S. patent application Ser. No. 17/853,980, filed on Jun. 30, 2022, which is a continuation of, and claims priority under 35 U.S.C. § 120 to, U.S. patent application Ser. No. 16/708,571, filed on Dec. 10, 2019, now granted U.S. Pat. No. 11,408,129, issued Aug. 9, 2022, now granted U.S. Pat. No. 11,732,420, which claims the benefit, under 35 USC § 119(e), of U.S. Provisional Patent Application Ser. No. 62/777,286, filed Dec. 10, 2018, the entire disclosures of which are fully incorporated by reference herein.

FIELD

The present disclosure generally relates to fibrous structures and, more particularly, to fibrous structures comprising discrete elements situated in patterns. The present disclosure also generally relates to papermaking belts that are used in creating fibrous structures and, more particularly, to papermaking belts that are used in creating fibrous structures comprising discrete elements situated in patterns.

BACKGROUND

Fibrous structures, such as sanitary tissue products, are useful in everyday life in various ways. These products can be used as wiping implements for post-urinary and post-bowel movement cleaning (toilet tissue and wet wipes), for otorhinolaryngological discharges (facial tissue), and multi-functional absorbent and cleaning uses (paper towels). Retail consumers of such fibrous structures look for products with certain performance properties, for example softness, smoothness, strength, and absorbency. For fibrous structures provided in roll form (e.g., toilet tissue and paper towels), retail consumers also look for products with roll properties that indicate value and quality, such as higher roll bulk, greater roll firmness, and lower roll compressibility. Accordingly, manufacturers seek to make fibrous structures with such desired properties through selection of material components, as well as selection of equipment and processes used in manufacturing the fibrous structures.

Of further importance in today's retail environment are the consumer-desired aesthetics of the fibrous structures. However, many times the independent goals of superior product performance (e.g., performance properties and/or roll properties) and consumer desired aesthetics are in contradiction to one another. For instance, the smoothness of a paper towel may depend on the wet-laid structure provided by the papermaking belt utilized during paper production and/or the emboss pattern applied during the paper converting process. But such papermaking-belt-provided structure and/or emboss may make the product visually unappealing to the consumer. Or a paper towel may be visually appealing to the consumer through the papermaking-belt-provided structure and/or emboss but have an undesired level of smoothness. Accordingly, manufacturers continually seek to make new fibrous structures with a combination of good performance and consumer-desired aesthetics.

BRIEF DESCRIPTION OF THE DRAWINGS

The above-mentioned and other features and advantages of this disclosure, and the manner of attaining them, will become more apparent and the disclosure itself will be better understood by reference to the following description of non-limiting examples of the disclosure taken in conjunction with the accompanying drawings, wherein:

FIG. 5 is a plan view of a portion of a mask pattern used to make the papermaking belt that produced the fibrous structure of FIG. 4;

FIG. 6 is a plan view of a portion of a mask pattern used to make a papermaking belt that can produce an example of the new fibrous structures detailed herein;

FIG. 7 is a plan view of a portion of a mask pattern used to make a papermaking belt that can produce an example of the new fibrous structures detailed herein;

FIG. 8 is a plan view of a portion of a mask pattern used to make a papermaking belt that can produce an example of the new fibrous structures detailed herein;

DETAILED DESCRIPTION

Figure 1:
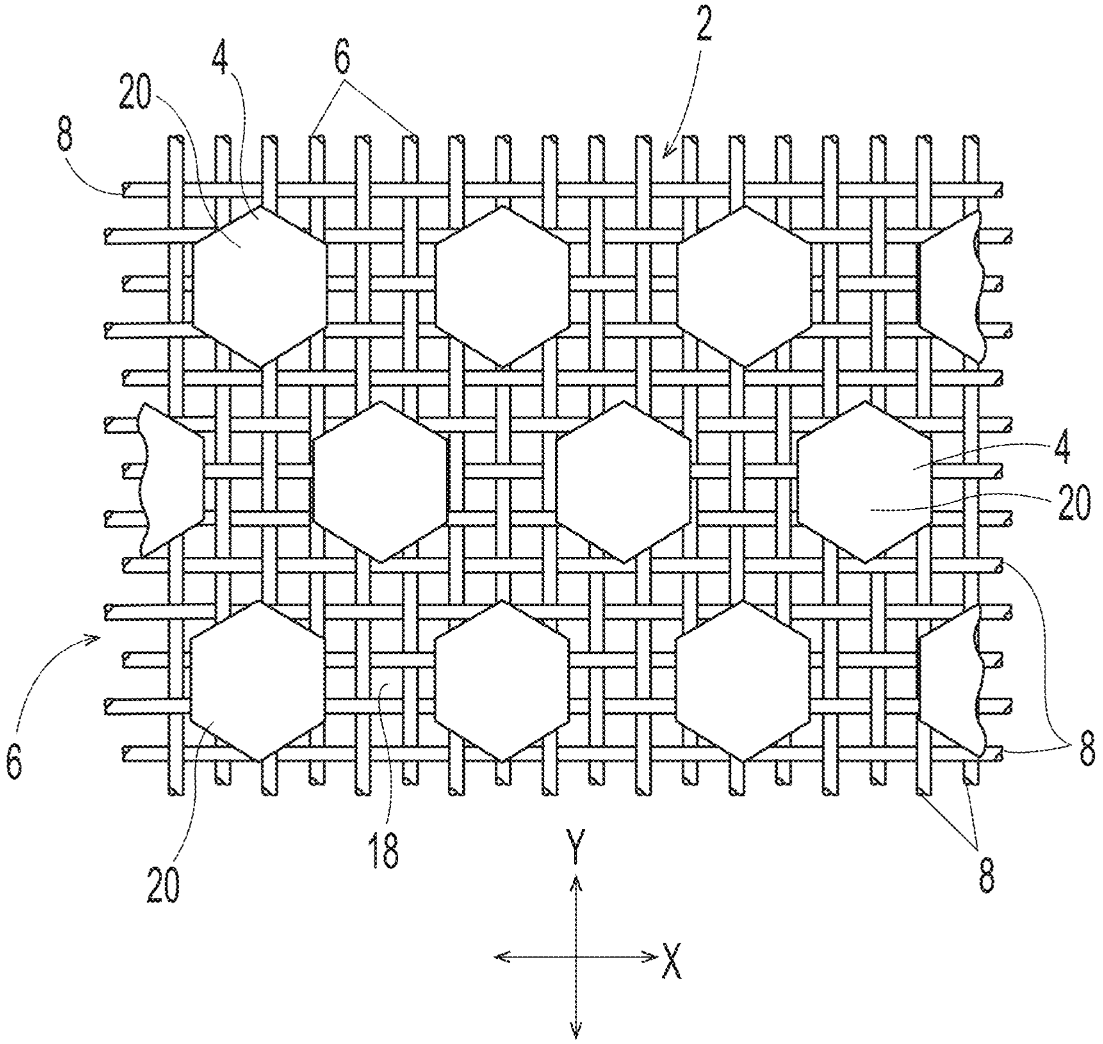
Fig. 1 PRIOR ART
FIG. 1 is a representative papermaking belt of the kind useful to make the fibrous structures of the present disclosure.

Various non-limiting examples of the present disclosure will now be described to provide an overall understanding of the principles of the structure, function, manufacture, and use of the fibrous structures disclosed herein. One or more non-limiting examples are illustrated in the accompanying drawings. Those of ordinary skill in the art will understand that the fibrous structures described herein and illustrated in the accompanying drawings are non-limiting examples. The features illustrated or described in connection with one non-limiting example can be combined with the features of other non-limiting examples. Such modifications and variations are intended to be included within the scope of the present disclosure.

Fibrous structures such as sanitary tissue products, including paper towels, bath tissues and facial tissues are typically made in "wet-laid" papermaking processes. In such papermaking processes, a fiber slurry, usually wood pulp fibers, is deposited onto a forming wire and/or one or more papermaking belts such that an embryonic fibrous structure is formed. After drying and/or bonding the fibers of the embryonic fibrous structure together, a fibrous structure is formed. Further processing of the fibrous structure can then be carried out after the papermaking process. For example, the fibrous structure can be wound on the reel and/or ply-bonded and/or embossed. As further discussed herein, visually distinct features may be imparted to the fibrous structures in different ways. In a first method, the fibrous structures can have visually distinct features added during the papermaking process. In a second method, the fibrous structures can have visually distinct features added during the converting process (i.e., after the papermaking process). Some fibrous structure examples disclosed herein may have visually distinct features added only during the papermaking process, and some fibrous structure examples may have visually distinct features added both during the papermaking process and the converting process.

Regarding the first method, a wet-laid papermaking process can be designed such that the fibrous structure has visually distinct features "wet-formed" during the papermaking process. Any of the various forming wires and papermaking belts utilized can be designed to leave physical, three-dimensional features within the fibrous structure. Such three-dimensional features are well known in the art, particularly in the art of "through air drying" (TAD) papermaking processes, with such features often being referred to in terms of "knuckles" and "pillows." "Knuckles," or "knuckle regions," are typically relatively high-density regions that are wet-formed within the fibrous structure (extending from a pillow surface of the fibrous structure) and correspond to the knuckles of a papermaking belt, i.e., the filaments or resinous structures that are raised at a higher elevation than other portions of the belt. "Relatively high density" as used herein means a portion of a fibrous structure having a density that is higher than a relatively low-density portion of the fibrous structure. Relatively high density can be in the range of 0.1 to 0.13 g/cm$^3$, for example, relative to a low density that can be in the range of 0.02 g/cm$^3$ to 0.09 g/cm$^3$.

Likewise, "pillows," or "pillow regions," are typically relatively low-density regions that are wet-formed within the fibrous structure and correspond to the relatively open regions between or around the knuckles of the papermaking belt. The pillow regions form a pillow surface of the fibrous structure from which the knuckle regions extend. "Relatively low density" as used herein means a portion of a fibrous structure having a density that is lower than a relatively high-density portion of the fibrous structure. Relatively low density can be in the range of 0.02 g/cm$^3$ to 0.09 g/cm$^3$, for example relative to a high density that can be in the range of 0.1 to 0.13 g/cm$^3$. Further, the knuckles and pillows wet-formed within a fibrous structure can exhibit a range of basis weights and/or densities relative to one another, as varying the size of the knuckles or pillows on a papermaking belt can alter such basis weights and/or densities. A fibrous structure (e.g., sanitary tissue products) made through a TAD papermaking process as detailed herein is known in the art as "TAD paper."

Thus, in the description herein, the terms "knuckles" or "knuckle regions," or the like can be used to reference either the raised portions of a papermaking belt or the densified, raised portions wet-formed within the fibrous structure made on the papermaking belt (i.e., the raised portions that extend from a surface of the fibrous structure), and the meaning should be clear from the context of the description herein. Likewise "pillows" or "pillow regions" or the like can be used to reference either the portion of the papermaking belt between or around knuckles (also referred to herein and in the art as "deflection conduits" or "pockets"), or the relatively uncompressed regions wet-formed between or around the knuckles within the fibrous structure made on the papermaking belt, and the meaning should be clear from the context of the description herein. Knuckles or pillows can each be either continuous or discrete, as described herein. As shown in FIGS. 5 and 6 and later described below, such illustrated masks would be used in producing papermaking belts that would create fibrous structures that have discrete knuckles and continuous/substantially continuous pillows. As shown in FIGS. 7 and 8 and later described below, such illustrated masks would be used in producing papermaking belts that would create fibrous structures that have discrete pillows and continuous/substantially continuous knuckles. The term "discrete" as used herein with respect to knuckles and/or pillows means a portion of a papermaking belt or fibrous structure that is defined or surrounded by, or at least mostly defined or surrounded by, a continuous/substantially continuous knuckle or pillow. The term "continuous/substantially continuous" as used herein with respect to knuckles and/or pillows means a portion of a papermaking belt or fibrous structure network that fully, or at least mostly, defines or surrounds a discrete knuckle or pillow. Further, the substantially continuous member can be interrupted by macro patterns formed in the papermaking belt, as disclosed in U.S. Pat. No. 5,820,730 issued to Phan et al. on Oct. 13, 1998.

Knuckles and pillows in paper towels and bath tissue can be visible to the retail consumer of such products. The knuckles and pillows can be imparted to a fibrous structure from a papermaking belt at various stages of the papermaking process (i.e., at various consistencies and at various unit operations during the drying process) and the visual pattern generated by the pattern of knuckles and pillows can be designed for functional performance enhancement as well as to be visually appealing. Such patterns of knuckles and pillows can be made according to the methods and processes described in U.S. Pat. No. 6,610,173, issued to Lindsay et al. on Aug. 26, 2003, or U.S. Pat. No. 4,514,345 issued to Trokhan on Apr. 30, 1985, or U.S. Pat. No. 6,398,910 issued to Burazin et al. on Jun. 4, 2002, or US Pub. No. 2013/0199741; published in the name of Stage et al. on Aug. 8, 2013. The Lindsay, Trokhan, Burazin and Stage disclosures describe belts that are representative of papermaking belts made with cured resin on a woven reinforcing member, of which aspects of the present disclosure are an improvement. But in addition, the improvements detailed herein can be utilized as a fabric crepe belt as disclosed in U.S. Pat. No. 7,494,563, issued to Edwards et al. on Feb. 24, 2009 or U.S. Pat. No. 8,152,958, issued to Super et al. on Apr. 10, 2012, as well as belt crepe belts, as described in U.S. Pat. No. 8,293,072, issued to Super et al on Oct. 23, 2012. When utilized as a fabric crepe belt, a papermaking belt of the present disclosure can provide the relatively large recessed pockets and sufficient knuckle dimensions to redistribute the fiber upon high impact creping in a creping nip between a backing roll and the fabric to form additional bulk in conventional wet-laid press processes. Likewise, when utilized as a belt in a belt crepe method, a papermaking belt of the present disclosure can provide the fiber enriched dome regions arranged in a repeating pattern corresponding to the pattern of the papermaking belt, as well as the interconnected plurality of surrounding areas to form additional bulk and local basis weight distribution in a conventional wet-laid process.

An example of a papermaking belt structure of the general type useful in the present disclosure and made according to the disclosure of U.S. Pat. No. 4,514,345 is shown in FIG. 1. As shown, the papermaking belt 2 can include cured resin elements 4 forming knuckles 20 on a woven reinforcing member 6. The reinforcing member 6 can be made of woven filaments 8 as is known in the art of papermaking belts, for example resin coated papermaking belts. The papermaking belt structure shown in FIG. 1 includes discrete knuckles 20 and a continuous deflection conduit, or pillow region. The discrete knuckles 20 can wet-form densified knuckles within the fibrous structure made thereon; and, likewise, the continuous deflection conduit, i.e. pillow region, can wet-form a continuous pillow region within the fibrous structure made thereon. The knuckles can be arranged in a pattern described with reference to an X-Y coordinate plane, and the distance between knuckles 20 in at least one of the X or Y directions can vary according to the examples disclosed herein. For clarity, a fibrous structure's visually distinct knuckle(s) and pillow(s) that are wet-formed in a wet-laid papermaking process are different from, and independent of, any further structure added to the fibrous structure during later, optional, converting processes (e.g., one or more embossing process).

After completion of the papermaking process, a second way to provide visually distinct features to a fibrous structure is through embossing. Embossing is a well known converting process in which at least one embossing roll having a plurality of discrete embossing elements extending radially outwardly from a surface thereof can be mated with a backing, or anvil, roll to form a nip in which the fibrous structure can pass such that the discrete embossing elements compress the fibrous structure to form relatively high density discrete elements ("embossed regions") in the fibrous structure while leaving an uncompressed, or substantially uncompressed, relatively low density continuous, or substantially continuous, network ("non-embossed regions") at least partially defining or surrounding the relatively high density discrete elements.

Embossed features in paper towels and bath tissues can be visible to the retail consumer of such products. Such patterns are well known in the art and can be made according to the methods and processes described in US Pub. No. US 2010-0028621 A1 in the name of Byrne et al. or US 2010-0297395 A1 in the name of Mellin, or U.S. Pat. No. 8,753,737 issued to McNeil et al. on Jun. 17, 2014. For clarity, such embossed features originate during the converting process, and are different from, and independent of, the pillow and knuckle features that are wet-formed on a papermaking belt during a wet-laid papermaking process as described herein.

In one example, a fibrous structure of the present disclosure has a pattern of knuckles and pillows imparted to it by a papermaking belt having a corresponding pattern of knuckles and pillows that provides for superior product performance over known fibrous structures and is visually appealing to a retail consumer.

In another example, a fibrous structure of the present disclosure has a pattern of knuckles and pillows imparted to it by a papermaking belt having a corresponding pattern of knuckles and pillows, as well as an emboss pattern, which together provide for an overall visual appearance that is appealing to a retail consumer.

In another example, a fibrous structure of the present disclosure has a pattern of knuckles and pillows imparted to it by a papermaking belt having a corresponding pattern of knuckles and pillows, as well as an emboss pattern, which together provide for an overall visual appearance that is appealing to a retail consumer and exhibit superior product performance over known fibrous structures.

Fibrous Structures

The fibrous structures of the present disclosure can be single-ply or multi-ply and may comprise cellulosic pulp fibers. Other naturally-occurring and/or non-naturally occurring fibers can also be present in the fibrous structures. In some examples, the fibrous structures can be wet-formed and through-air dried in a TAD process, thus producing TAD paper. The fibrous structures can be marketed as single- or multi-ply sanitary tissue products.

The fibrous structures detailed herein will be described in the context of paper towels, and in the context of a papermaking belt comprising cured resin on a woven reinforcing member. However, the scope of disclosure is not limited to paper towels (scope also includes, for example, other sanitary tissues such as toilet tissue and facial tissue) and includes other known processes that impart the knuckles and pillow patterns described herein, including, for example, the fabric crepe and belt crepe processes described above, and modified as described herein to produce the papermaking belts and paper as detailed herein.

In general, examples of the fibrous structures can be made in a process utilizing a papermaking belt that has a pattern of cured resin knuckles on a woven reinforcing member of the type described in reference to FIG. 1. The resin pattern is dictated by a patterned mask having opaque regions and transparent regions. The transparent regions permit curing radiation to penetrate and cure the resin, while the opaque regions prevent the radiation from curing portions of the resin. Once curing is achieved and the patterned mask is removed, the uncured resin is washed away to leave a pattern of cured resin that is substantially identical to the mask pattern. The cured resin portions are the knuckles of the papermaking belt, and the areas between/around the cured resin portions are the pillows or deflection conduits of the belt. Thus, the mask pattern is replicated in the cured resin pattern of the papermaking belt, which is essentially replicated again in the fibrous structure made on the papermaking belt. Therefore, in describing the fibrous structures' patterns of knuckles and pillows herein, a description of the patterned mask can serve as a proxy. One skilled in the art will understand that the dimensions and appearance of the patterned mask are essentially identical to the dimensions and appearance of the papermaking belt made through utilization of the mask. One skilled in the art will further understand that the dimensions and appearance of the wet-laid fibrous structure made on the papermaking belt are also essentially identical to the dimensions and appearance of the patterned mask. Further, in processes that use a papermaking belt that are not made from a mask, the dimensions and appearance of the papermaking belt are also imparted to the fibrous structure, such that the dimensions of features of such papermaking belt can also be measured and characterized as a proxy for the dimensions and characteristics of the fibrous structure produced thereon.

Figure 2:
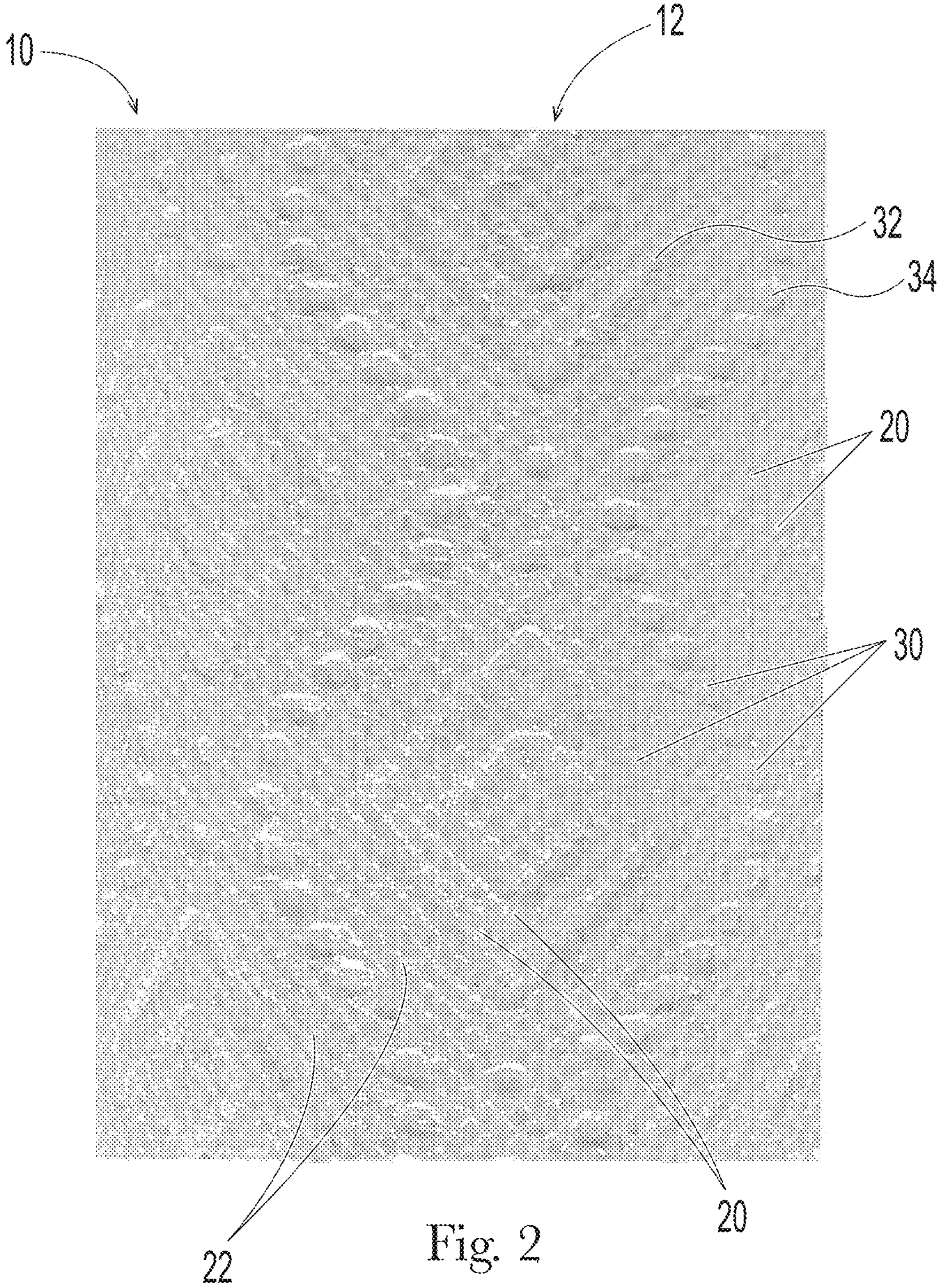
Fig. 2 PRIOR ART
FIG. 2 is a photograph of a portion of a paper towel product previously marketed by The Procter & Gamble Co.
Figure 3:
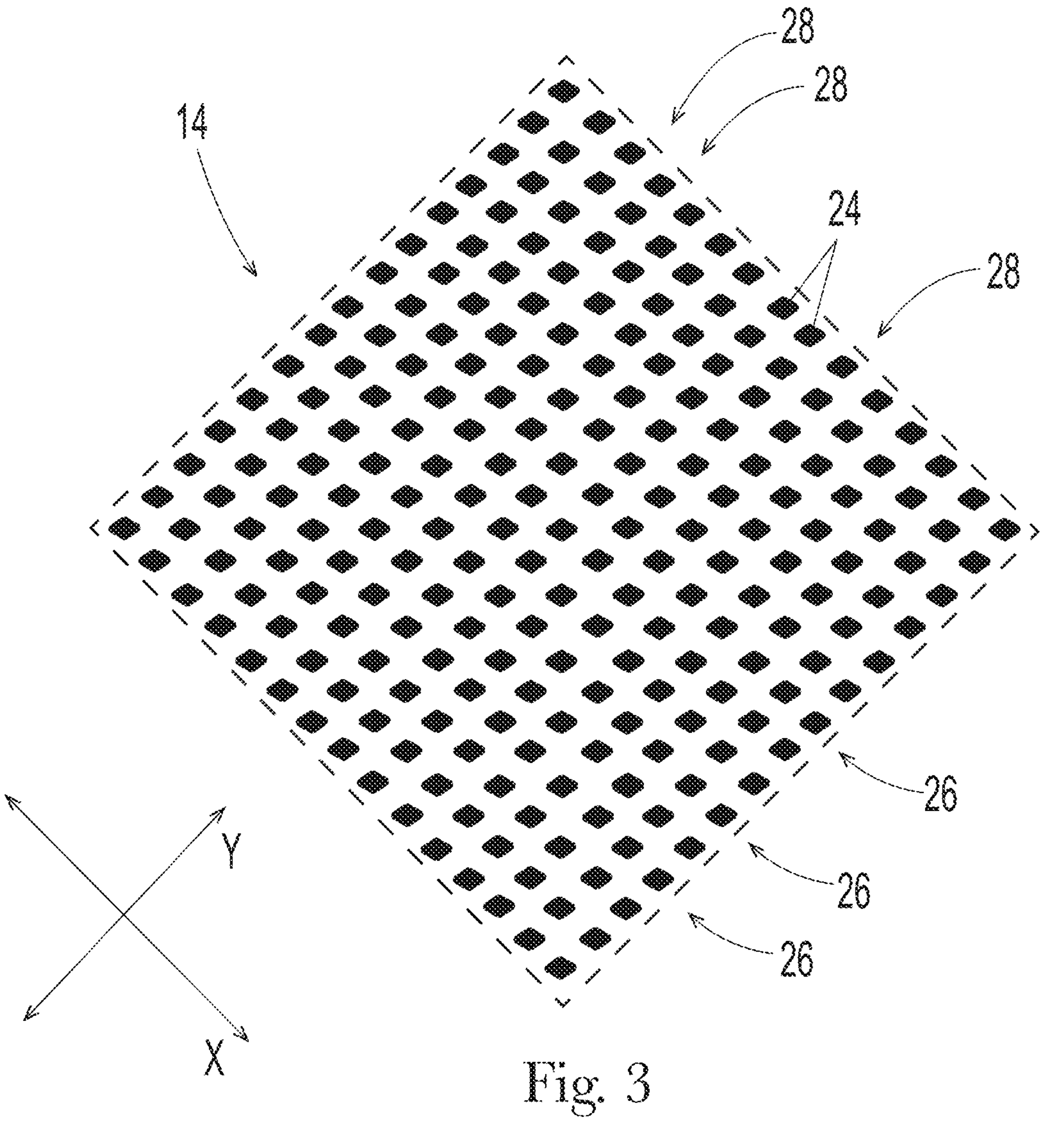
Fig. 3 PRIOR ART
FIG. 3 is a plan view of a portion of a mask pattern used to make the papermaking belt that produced the paper towel of FIG. 2.

FIG. 2 illustrates a portion of a sheet on a roll 10 of sanitary tissue 12 previously marketed by The Procter & Gamble Co. as BOUNTY® paper towels. FIG. 3 shows the mask 14 used to make the papermaking belt (actual belt not shown, but of the general type shown in FIG. 1, having a pattern of knuckles corresponding to the black portions of the mask of FIG. 3) that made the sanitary tissue 12 shown in FIG. 2. As shown, sanitary tissue 12 exhibits a pattern of knuckles 20 which were formed by discrete cured resin knuckles on a papermaking belt, and which correspond to the black areas, referred to as cells 24 of the mask 14 shown in FIG. 3. Any portion of the pattern of FIG. 3 that is black represents a transparent region of the mask, which permits UV-light curing of UV-curable resin to form a knuckle on the papermaking belt. Likewise, each knuckle on the papermaking belt forms a knuckle 20 in sanitary tissue 12, which is a relatively high-density region and/or a region of different basis weight relative to the pillow regions. Any portion of the pattern of FIG. 3 that is white represents an opaque region of the mask, which blocks UV-light curing of the UV-curable resin. After the mask is removed, the uncured resin is ultimately washed away to form a deflection conduit on the papermaking belt. When a fibrous structure is made on the papermaking belt, the fibers will wet-form into the deflection conduit to form a relatively low-density pillow 22 within the fibrous structure.

As used herein, the term "cell" is used to represent a discrete element of a mask, belt, or fibrous structure. Thus, as illustrated in FIGS. 3, 5 and 6, the term "cell" can represent discrete black (transparent) portions of a mask, a discrete resinous element on a papermaking belt, or a discrete relatively high density/basis weight portion of a fibrous structure. In the description of FIGS. 3, 5, and 6 herein, the schematic representation of cells 24 can be considered representations of a discrete element of one or more transparent portions of a mask, one or more knuckles on a papermaking belt, or one or more knuckles in a fibrous structure. But the examples detailed herein are not limited to one method of making, so the term cell can refer to a discrete feature such as a raised element, a dome-shaped element or knuckle formed by belt or fabric creping on a fibrous structure, for example. Further, as illustrated in FIGS. 7 and 8, the term "cell" can also represent discrete white (opaque) portions of a mask, a discrete deflection conduit in a papermaking belt, or a discrete relatively low density/basis weight portion of a fibrous structure. In the description of FIGS. 7 and 8 herein, the schematic representation of cells 24 can be considered representations of a discrete element of one or more opaque portions of a mask, one or more deflection conduit on a papermaking belt, or one or more pillows in a fibrous structure. But the examples detailed herein are not limited to one method of making, so the term cell can also refer to a discrete feature such as a depressed element, a convex-shaped element or pillow formed by belt or fabric creping on a fibrous structure, for example.

The fibrous structures illustrated herein either exhibit a structure of discrete pillows and a continuous/substantially continuous knuckle region, or a structure of discrete knuckles and a continuous/substantially continuous pillow region. However, for every example described or illustrated herein, the inverse of such structure is also contemplated. In other words, if a structure of discrete knuckles and a continuous/substantially continuous pillow region is shown, an inverse similar structure of continuous/substantially continuous knuckles and discrete pillows is also contemplated. Moreover, in regard to the papermaking belts, as can be understood by the description herein, the inverse relationship can be achieved by inverting the black and white (or, more generally, the opaque and transparent) portions of the mask used to make the belt that is used to make the fibrous structure. This inverse relation (black/white) can apply to all patterns of the present disclosure, although all fibrous structures/patterns of each category are not illustrated for brevity. The papermaking belts of the present disclosure and the process of making them are described in further detail below.

The BOUNTY® paper towel shown in FIG. 2 has enjoyed tremendous market success. The product's performance together with its aesthetic visual appearance has proven to be very desirable to retail consumers. The visual appearance is due to the pattern of knuckles 20 and pillows 22 and the pattern of embossments 30. As shown, the previously marketed BOUNTY® paper towel product has both line embossments 32 and "dot" embossments 34. The pattern of knuckles 20 and pillows 22 is considered the "wet-formed" background pattern, and the pattern of embossments 30 overlaid thereon is considered "dry-formed". Thus, the pattern of knuckles and pillows and the embossments together give the paper towel its visual appearance. The previously marketed BOUNTY® paper towel shown in FIG. 2 will be used to contrast the newly disclosed examples of fibrous structures detailed herein. Thus, the newly disclosed examples of fibrous structures detailed herein are an improvement over such previously marketed BOUNTY® paper towels, with some of the improvements described below.

The previously marketed BOUNTY® paper towel product shown in FIG. 2 has a pattern of discrete knuckles and a continuous pillow region. As more clearly seen in the mask of FIG. 3, the cell 24 shape and orientation are both constant and the cells are ordered in straight rows 26, 28. One set of rows 26 is oriented in a direction that is parallel to the X-axis (i.e., in an X-direction) and one set of rows 28 is oriented in a direction that is parallel to the Y-axis (i.e., in a Y-direction). In other words, all cells 24 of the mask/fibrous structure will be a member of a row 26 that is oriented in an X-direction and will also be a member of a row 28 that is oriented in a Y-direction. The cell 24 knuckle size varies but the pillow width (as detailed below below) is constant. In other previously and currently marketed BOUNTY® paper towels (not illustrated), the fibrous structure patterns included a constant knuckle size and a varied pillow width, or patterns where both the knuckle size and the pillow width varied.

Figure 4:
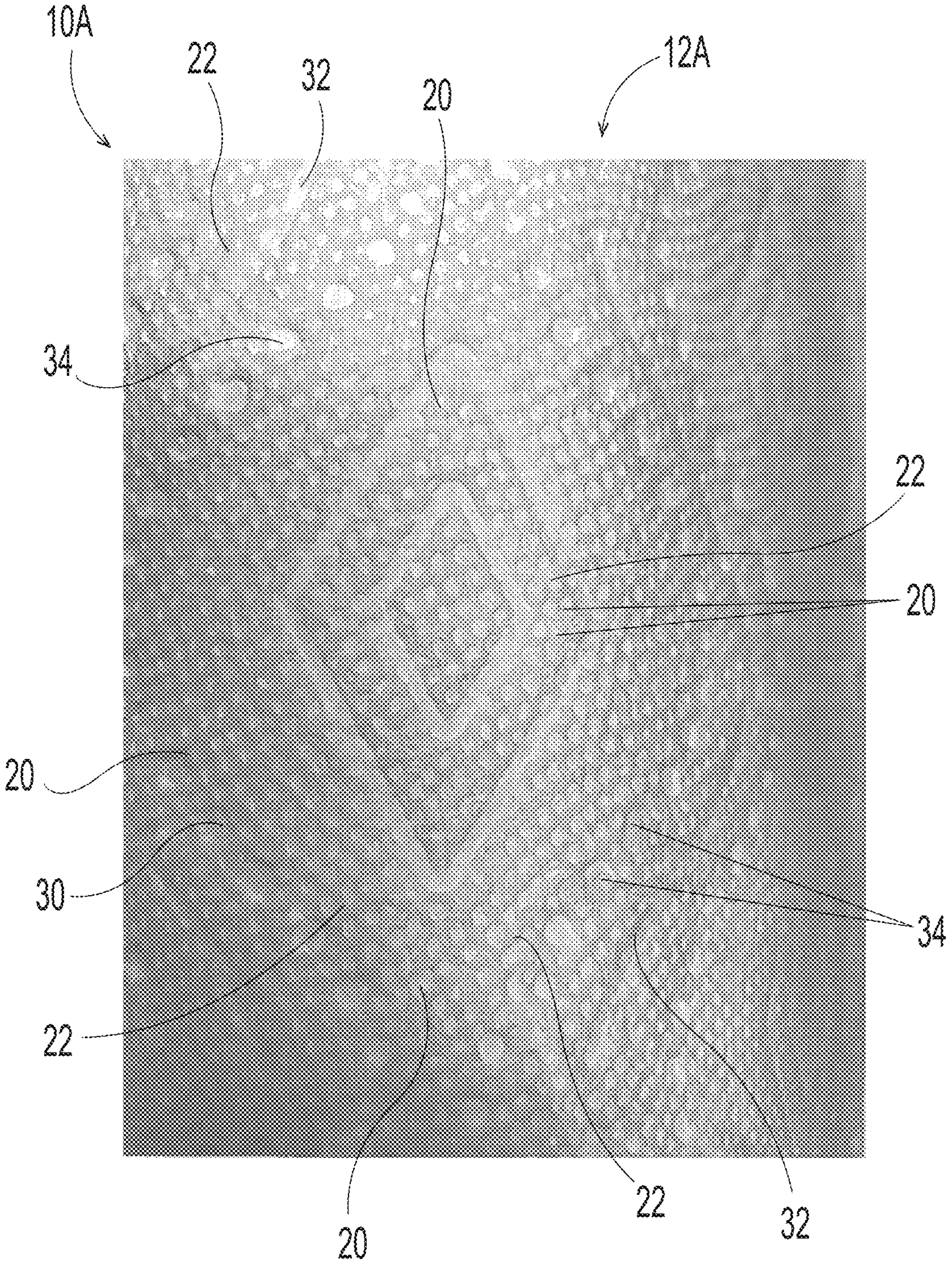
FIG. 4 is a photograph of a portion of a new fibrous structure as detailed herein.

To improve the product performance properties and/or aesthetics of the previously and currently marketed BOUNTY® paper towels, new patterns were created for the distribution of knuckles and pillows. FIG. 4 illustrates an exemplary roll 10A of sanitary tissue 12A produced with one of the new patterns. FIG. 5 shows a portion of the pattern on the mask 14A used to make the papermaking belt (not shown, but of the type shown in FIG. 1, having the pattern of knuckles corresponding to the mask of FIG. 5) that made the sanitary tissue 12A shown in FIG. 4. Again, as with the previously marketed BOUNTY® pattern above, the sanitary tissue 12A exhibits a pattern of knuckles 20 which were formed by discrete cured resin knuckles on a papermaking belt, and which correspond to the black areas, i.e., the cells 24, of the mask 14A shown in FIG. 5.

As depicted in the exemplary paper towel shown in FIG. 4, and more clearly depicted through the masks shown in FIGS. 5 and 6, the fibrous structures may have a pattern of discrete knuckles and a continuous/substantially continuous pillow region. However, in other examples the fibrous structures may also have a pattern of discrete pillows and a continuous/substantially continuous knuckle (e.g., the fibrous structures made by the masks of FIGS. 7 and 8). Whether utilizing a pattern of discrete knuckles or discrete pillows—either discrete item referred to as a "cell"—the cell 24 shape may be constant or varied, the cell 24 orientation may be constant or varied, and the cells may be ordered in a plurality of rows 26, 28. The cells may be in a diamond shape and have a two-dimensional area of between about 0.1 $mm^2$ and about 40.0 $mm^2$, or between about 0.5 $mm^2$ and about 8 $mm^2$, or between about 0.75 $mm^2$ and about 7.75 $mm^2$. Each of cells within a pattern may all be of the same size, or the size of the cell may vary within the pattern (i.e., at least two cells within the pattern are of a different size). If a pattern has cells in various sizes, the pattern may include 2, 3, 4, 5, 6, 7, 8, 9, 10, 15 or more different sizes. In one interesting example, the new fibrous structure patterns have three different cell 24 sizes.

The pattern of cells 24, organized by rows, can be understood in the context of an X-Y coordinate plane. A first plurality of rows 26 may be oriented in a direction that is parallel to the X-axis (i.e., an X-direction) and a second plurality of rows 28 may be oriented in a direction that is parallel to the Y-axis (i.e., a Y-direction). Accordingly, the cells 24 of the mask/fibrous structure may each be included within a row 26 oriented in an X-direction and may also be included within a row 28 oriented in a Y-direction. The examples herein describe pluralities of rows that are oriented in a direction either parallel to the X-axis or the Y-axis. However, for other contemplated examples, it is not necessary for the plurality of rows to be oriented in a direction that is parallel to the X-axis and/or Y-axis, as the rows can be oriented in other directions. For example, the rows may be oriented in an X or Y direction that is substantially parallel to the X-axis or Y-axis, or in any other direction that is not parallel to the X-axis or Y-axis. Accordingly, when one skilled in the art reviews the examples stating, "pluralities of rows that are oriented in an X-direction," similar examples where the rows are oriented substantially parallel, or not parallel, to the X-axis should also be contemplated. Moreover, in some examples (not illustrated), the X-Y coordinate plane may correspond to the machine and cross machine directions of the papermaking process as is known in the art. And in other examples, such as illustrated in the masks 14A, 14B, 14C, 14D of FIGS. 5-8, the X-Y coordinate plane does not correspond to the machine and cross machine directions of the papermaking process. "Machine Direction" or "MD" as used herein means the direction on a web corresponding to the direction parallel to the flow of a fibrous structure through a fibrous structure making machine. "Cross Machine Direction" or "CD" as used herein means a direction perpendicular to the Machine Direction in the plane of the web.

As shown in the exemplary paper towel of FIG. 4, and more clearly depicted through the masks 14A, 14B, 14C, 14D shown in FIGS. 5-8, the new fibrous structures differ from previously-marketed BOUNTY® paper towels in that at least one of the pluralities of rows 26, 28 of cells 24 is curved. In some examples, as illustrated in fibrous structure 12A of FIG. 4 and the corresponding mask 14A of FIG. 5 (as well as mask 14C of FIG. 7), both the plurality of rows 26 that are oriented in an X-direction and the plurality of rows 28 that are oriented in a Y-direction are curved. In other examples, as illustrated in the mask 14B of FIG. 6 (as well as mask 14D of FIG. 8), the plurality of rows 26 that are oriented in an X-direction are curved, and the plurality of rows 28 that are oriented in a Y-direction are straight/substantially straight. In yet other examples (not illustrated) the plurality of rows 28 that are oriented in a Y-direction are curved, and the plurality of rows 26 that are oriented in an X-direction are straight/substantially straight.

The curved rows may be shaped in a variety of regular and/or irregular curvatures. In some examples, the curved rows may be shaped in a repeating wave pattern, such as for example, a repeating sinusoidal wave pattern. The sinusoidal wave pattern may be regular (i.e., a repeating amplitude and wavelength) or irregular (a varying amplitude and/or wavelength). The amplitude of the sinusoidal wave pattern (i.e., vertical distance between a peak or a valley and the equilibrium point of the wave) may be between about 0.75 mm and about 4.0 mm, or between about 0.75 mm and about 3.0 mm, or between about 1.0 mm and about 3.0 mm, or between about 1.0 mm and about 2.5 mm, or between about 1.25 mm and about 2.5 mm, or between about 1.25 mm and about 2.25 mm, or between about 1.4 mm and about 2.0 mm, or between about 1.5 mm and about 1.9 mm, or about 1.75 mm, or about 1.6, or about 1.65. The wavelength of the sinusoidal wave pattern (i.e., the distance between two successive crests or troughs of the wave) may be between about 25.0 mm and about 125.0 mm, or between about 25.0 mm and about 100.0 mm, or between about 25.0 mm and about 75.0 mm, or between about 35.0 and about 65.0, or between 40.0 mm and about 60.0 mm, or between about 45.0 mm and about 55.0 mm, or about 48 mm, or about 50 mm, or about 52 mm. The sinusoidal wave pattern may have an amplitude to wavelength ratio of between about 0.02 and about 0.07, or between about 0.02 and about 0.05, or between about 0.025 and about 0.05, or between about 0.03 and about 0.04, or between about 0.031 and about 0.038, or between about 0.032 and about 0.036, or between about 0.033 and about 0.034, or about 0.0333.

The plurality of rows 26 of cells 24 in a pattern (either curved or straight) that are oriented in an X-direction may be separated from each another by a distance of between about 0.25 mm and about 10 mm, or between about 0.3 mm and about 7.5 mm, or between about 0.35 mm and about 7.0 mm, or between about 0.5 mm and about 5.0 mm, or between about 0.75 mm and about 3.0 mm. Such rows 26 that are oriented in an X-direction may be separated from each another by equal distances or may be separated from one another by varying distances. If the distances between the rows 26 that are oriented in an X-direction are varied, such variation can be random or predetermined to repeat in a uniform pattern.

The plurality of rows 28 of cells 24 in a pattern (either curved or straight) that are oriented in a Y-direction may be separated from each another by a distance of between about 0.25 mm and about 10 mm, or between about 0.3 mm and about 7.5 mm, or between about 0.35 mm and about 7.0 mm, or between about 0.5 mm and about 5.0 mm, or between about 0.75 mm and about 3.0 mm. Such rows 28 that are oriented in a Y-direction may be separated from each another by equal distances or may be separated from one another by varying distances. If the distances between the rows 28 that are oriented in a Y-direction are varied, such variation can be random or predetermined to repeat in a uniform pattern.

The fibrous structures containing the new wet-laid patterns as detailed herein (and shown in FIG. 4 as a non-limiting example), deliver a smoother, more fuzzy feeling surface when compared with previously-marketed BOUNTY® paper towels (as shown in FIG. 2). This is because of the curvature of the rows within the new patterns of cells (e.g., repeating sinusoidal wave with an amplitude and wavelength as detailed herein). Without being bound by theory, the curvature of the rows within the patterns of cells 14A, 14B, 14C, 14D provides a fibrous structure surface without an easily detectible ridge line when compared with previous fibrous structures having patterns that only included straight rows. Accordingly, as a consumer's finger moves across the surface of the new fibrous structures, the fingertip transitions from one cell 24 surface to the next without feeling any distinct ridges. Moreover, from an aesthetic design perspective, the curvature of the rows in the patterns 14A, 14B, 14C, 14D allows for placement of larger or smaller pillow zones in closer proximity to one another without effecting the overall visual aesthetics. This allows the use of increased pillow zone sizes (i.e., farther distances between rows) that will increase absorbency in the fibrous structures (as measured by SST, for example) without a consumer noticeable impact to visual aesthetics. Such improvements in fibrous structure performance/aesthetics are noted in patterns wherein the pluralities of rows in one direction are curved (e.g., the plurality of rows oriented in an X-direction are curved or the plurality of rows oriented in a Y-direction are curved), and even further improved in patterns wherein pluralities of rows in both directions are curved (e.g., the plurality of rows oriented in an X-direction are curved and the plurality of rows oriented in a Y-direction are curved). Such improvements in in fibrous structure performance/aesthetics can also be further improved in patterns that utilize knuckles of various size within the pattern, for example three different size knuckles within the pattern.

As detailed for the exemplary paper towel 10A of FIG. 4, the fibrous structures detailed herein can also be embossed to contain a series of line embossments 32 and dot embossments 34 in combination with the wet-formed knuckles 20 and pillows 22 pattern described herein to provide a desired aesthetic. Nonlimiting examples of the new fibrous structures as detailed herein, including the paper towel of FIG. 4, may have the following properties:

A basis weight of between about 30 g/m$^2$ and about 80 g/m$^2$, or between about 40 g/m$^2$ and about 65 g/m$^2$, or between about 45 g/m$^2$ and about 60 g/m$^2$, or between about 50 g/m$^2$ and about 58 g/m$^2$, or between about 50 g/m$^2$ and about 55 g/m$^2$.

A TS7 value of less than about 20.00 dB V$^2$rms, or less than about 19.50 dB V$^2$rms, or less than about 19.00 dB V$^2$rms, or less than about 18.50 dB V$^2$rms, or less than about 18.00 dB V$^2$ rms, or less than about 17.50 dB V$^2$rms, or between about 0.01 dB V$^2$rms and about 20.00 dB V$^2$ rms, or between about 0.01 dB V$^2$rms and about 19.50 dB V$^2$rms, or between about 0.01 dB V$^2$ rms and about 19.00 dB V$^2$rms, or between about 0.01 dB V$^2$rms and about 18.50 dB V$^2$rms, or between about 0.01 dB V$^2$rms and about 18.00 dB V$^2$rms, or between about 0.01 dB V$^2$rms and about 17.50 dB V$^2$rms, or between about 5.0 dB V$^2$ rms and about 20.00 dB V$^2$rms, or between about 10.00 dB V$^2$rms and about 20.00 dB V$^2$rms, or between about 15.00 dB V$^2$rms and about 20.00 dB V$^2$rms.

An SST value (absorbency rate) of greater than about 1.60 g/sec$^{0.5}$, or greater than about 1.65 g/sec$^{0.5}$, or greater than about 1.70 g/sec$^{0.5}$, or greater than about 1.75 g/sec$^{0.5}$, or greater than about 1.80 g/sec$^{0.5}$, or greater than about 1.82 g/sec$^{0.5}$, or greater than about 1.85 g/sec$^{0.5}$, or greater than about 1.88 g/sec$^{0.5}$, or greater than about 1.90 g/sec$^{0.5}$, or greater than about 1.95 g/sec$^{0.5}$, or greater than about 2.00 g/sec$^{0.5}$, or between about 1.60 g/sec$^{0.5}$ and about 2.50 g/sec$^{0.5}$, or between about 1.65 g/sec$^{0.5}$ and about 2.50 g/sec$^{0.5}$, or between about 1.70 g/sec$^{0.5}$ and about 2.40 g/sec$^{0.5}$, or between about 1.75 g/sec$^{0.5}$ and about 2.30 g/sec$^{0.5}$, or between about 1.80 g/sec$^{0.5}$ and about 2.20 g/sec$^{0.5}$, or between about 1.82 g/sec$^{0.5}$ and about 2.10 g/sec$^{0.5}$, or between about 1.85 g/sec$^{0.5}$ and about 2.00 g/sec$^{0.5}$.

A Plate Stiffness value of greater than about 12 N*mm, or greater than about 12.5 N*mm, or greater than about 13.0 N*mm, or greater than about 13.5 N*mm, or greater than about 14 N*mm, or greater than about 14.5 N*mm, or greater than about 15 N*mm, or greater than about 15.5 N*mm, or greater than about 16 N*mm, or greater than about 16.5 N*mm, or greater than about 17 N*mm, or between about 12 N*mm and about 20 N*mm, or between about 12.5 N*mm and about 20 N*mm, or between about 13 N*mm and about 20 N*mm, or between about 13.5 N*mm and about 20 N*mm, or between about 14 N*mm between about 20 N*mm, or between about 14.5 N*mm and about 20 N*mm, or between about 15 N*mm and about 20 N*mm, or between about 15.5 N*mm and about 20 N*mm, or between about 16 N*mm and about 20 N*mm, or between about 16.5 N*mm and about 20 N*mm, or between about 17 N*mm and about 20 N*mm.

A Resilient Bulk value of greater than about 85 cm$^3$/g, or greater than about 90 cm$^3$/g, or greater than about 95 cm$^3$/g, or greater than about 100 cm$^3$/g, or greater than about 102 cm$^3$/g, or greater than about 105 cm$^3$/g, or between about 85 cm$^3$/g and about 110 cm$^3$/g, or between about 90 cm$^3$/g and about 110 cm$^3$/g, or between about 95 cm$^3$/g and about 110 cm$^3$/g, or between about 100 cm$^3$/g and about 110 cm$^3$/g.

A Total Wet Tensile value of greater than about 400 g/in, or greater than about 450 g/in, or greater than about 500 g/in, or greater than about 550 g/in, or greater than about 600 g/in, or greater than about 650 g/in, or greater than about 700 g/in, or greater than about 750 g/in, or greater than about 800 g/in, or greater than about 850 g/in, or greater than about 900 g/in, or between about 400 g/in and about 900 g/in, or between about 450 g/in and about 900 g/in, or between about 500 g/in and about 900 g/in, or between about 550 g/in and about 900 g/in, or between about 600 g/in and about 900 g/in, or between about 650 g/in and about 900 g/in, or between about 700 g/in and about 900 g/in.

A Wet Burst value of greater than about 300 g, or greater than about 350 g, or greater than about 400 g, or greater than about 450 g, or greater than about 500 g, or greater than about 550 g, or greater than about 600 g, or between about 300 g and about 650 g, or between about 350 g and about 600 g, or between about 350 g and about 550 g, or between about 400 g and about 550 g, or between about 400 g and about 525 g.

A Flexural Rigidity value of greater than about 700 mg-cm, or greater than about 800 mg-cm, or greater than about 900 mg-cm, or greater than about 1000 mg-cm, or greater than about 1100 mg-cm, or greater than about 1200 mg-cm, or greater than about 1300 mg-cm, or greater than about 1400 mg-cm, or greater than about 1500 mg-cm, or greater than about 1600 mg-cm, or greater than about 1700 mg-cm, or between about 700 mg-cm and about 1700 mg-cm, or between about 800 mg-cm and about 1500 mg-cm, or between about 900 mg-cm and about 1400 mg-cm, or between about 1000 mg-cm and about 1350 mg-cm, or between about 1050 mg-cm and about 1350 mg-cm, or between about 1100 mg-cm and about 1350 mg-cm, or between about 1100 mg-cm and about 1300 mg-cm.

Examples of the fibrous structures detailed herein may have only one of the above properties within one of the defined ranges, or all the properties within one of the defined ranges, or any combination of properties within one of the defined ranges.

Previously-marketed BOUNTY® paper towels have a TS7 value of 20.72 dB V$^2$rms, an SST value of 1.76 g/sec$^{0.5}$, a Plate Stiffness value of 13.4 N*mm, a Resilient Bulk value of 98.9 cm$^3$/g, and a Total Wet Tensile value of 796 g/in.

In addition to superior absorbency rates and the other beneficial properties as detailed above, the new fibrous structures detailed herein permit the fibrous structure manufacturer to wind rolls with high roll bulk (for example greater than 4 cm$^3$/g), and/or greater roll firmness (for example between about 2.5 mm to about 15 mm), and/or lower roll percent compressibility (low percent compressibility, for example less than 10% compressibility).

"Roll Bulk" as used herein is the volume of paper divided by its mass on the wound roll. Roll Bulk is calculated by multiplying pi (3.142) by the quantity obtained by calculating the difference of the roll diameter squared in cm squared (cm$^2$) and the outer core diameter squared in cm squared (cm$^2$) divided by 4, divided by the quantity sheet length in cm multiplied by the sheet count multiplied by the Bone Dry Basis Weight of the sheet in grams (g) per cm squared (cm$^2$).

Examples of the new fibrous structures described herein may be in the form of rolled tissue products (single-ply or multi-ply), for example a dry fibrous structure roll, and may exhibit a roll bulk of from about 4 $cm^3/g$ to about 30 $cm^3/g$ and/or from about 6 $cm^3/g$ to about 15 $cm^3/g$, specifically including all 0.1 increments between the recited ranges. The new rolled sanitary tissue products of the present disclosure may exhibit a roll bulk of greater than about 4 $cm^3/g$, greater than about 5 $cm^3/g$, greater than about 6 $cm^3/g$, greater than about 7 $cm^3/g$, greater than about 8 $cm^3/g$, greater than about 9 $cm^3/g$, greater than about 10 $cm^3/g$ and greater than about 12 $cm^3/g$, and less than about 20 $cm^3/g$, less than about 18 $cm^3/g$, less than about 16 $cm^3/g$, and/or less than about 14 $cm^3/g$, specifically including all 0.1 increments between the recited ranges.

Additionally, examples of the new fibrous structures detailed herein may exhibit a roll firmness of from about 2.5 mm to about 15 mm and/or from about 3 mm to about 13 mm and/or from about 4 mm to about 10 mm, specifically including all 0.1 increments between the recited ranges.

Additionally, examples of the new fibrous structures detailed herein may be in the form of a rolled tissue products (single-ply or multi-ply), for example a dry fibrous structure roll, and may have a percent compressibility of less than 10% and/or less than 8% and/or less than 7% and/or less than 6% and/or less than 5% and/or less than 4% and/or less than 3% to about 0% and/or to about 0.5% and/or to about 1%, and/or from about 4% to about 10% and/or from about 4% to about 8% and/or from about 4% to about 7% and/or from about 4% to about 6% as measured according to the Percent Compressibility Test Method described herein.

Examples of the new rolled sanitary tissue products of the present disclosure may exhibit a roll bulk of greater than 4 $cm^3/g$ and a percent compressibility of less than 10% and/or a roll bulk of greater than 6 $cm^3/g$ and a percent compressibility of less than 8% and/or a roll bulk of greater than 8 $cm^3/g$ and a percent compressibility of less than 7%.

Additionally, examples of the new rolled tissue products as detailed herein can be individually packaged to protect the fibrous structure from environmental factors during shipment, storage and shelving for retail sale. Any of known methods and materials for wrapping bath tissue or paper towels can be utilized. Further, the plurality of individual packages, whether individually wrapped or not, can be wrapped together to form a package having inside a plurality of the new rolled tissue products as detailed herein. The package can have 2, 3, 4, 5, 6, 7, 8, 9, 10, 12, 14, 16 or more rolls. In such packages, the roll bulk and percent compressibility can be important factors in package integrity during shipping, storage, and shelving for retail sale. Further, the plurality of individual packages, or the packages having a plurality of the new rolled tissue products as detailed herein, can be palletized (i.e., organized and/or transported on a pallet). In such pallets of the new rolled tissue products as detailed herein, the roll bulk and percent compressibility can be important factors in package integrity during shipping, storage, and shelving for retail sale.

Further, a package of a plurality of individual rolled tissue products, in which at least one of the rolled tissue products exhibits a roll bulk of greater than 4 $cm^3/g$ or a percent compressibility of less than 10% is contemplated. In one example, a package of a plurality of individual rolled tissue products, in which at least one of the rolled tissue products exhibits a roll bulk of greater than 4 $cm^3/g$ and a percent compressibility of less than 10% is contemplated. In another example, a package of a plurality of individual rolled tissue products, in which at least one of the rolled tissue products exhibits a roll bulk of greater than 6 $cm^3/g$ and a percent compressibility of less than 8% is contemplated.

Papermaking Belts

The fibrous structures of the present disclosure can be made using a papermaking belt of the type described in FIG. 1, but with knuckles and pillows in the new patterns 14A, 14B, 14C, 14D described herein. The papermaking belt can be thought of as a molding member. A "molding member" is a structural element having cell sizes and placement as described herein that can be used as a support for an embryonic web comprising a plurality of cellulosic fibers and/or a plurality of synthetic fibers as well as to "mold" a desired geometry of the fibrous structures during papermaking (excluding "dry" processes such as embossing). The molding member can comprise fluid-permeable areas and can impart a three-dimensional pattern of knuckles to the fibrous structure being produced thereon, and includes, without limitation, single-layer and multi-layer structures in the class of papermaking belts having UV-cured resin knuckles on a woven reinforcing member as disclosed in the above-mentioned U.S. Pat. No. 6,610,173, issued to Lindsay et al. or U.S. Pat. No. 4,514,345 issued to Trokhan.

In one example, the papermaking belt is a fabric crepe belt for use in a process as disclosed in the above-mentioned U.S. Pat. No. 7,494,563, issued to Edwards, but having a pattern of cells, i.e., knuckles, as disclosed herein. Fabric crepe belts can be made by extruding, coating, or otherwise applying a polymer, resin, or other curable material onto a support member, such that the resulting pattern of three-dimensional features are belt knuckles with the pillow regions serving as large recessed pockets. In another example, the papermaking belt can be a continuous knuckle belt of the type exemplified in FIG. 1 of U.S. Pat. No. 4,514,345 issued to Trokhan, having deflection conduits that serve as the recessed pockets of the belt shown and described in U.S. Pat. No. 7,494,563, for example in place of the fabric crepe belt shown and described therein.

In an example of a method for making fibrous structures of the present disclosure, the method can comprise the steps of:

(a) providing a fibrous furnish comprising fibers; and
(b) depositing the fibrous furnish onto a molding member such that at least one fiber is deflected out-of-plane of the other fibers present on the molding member.

In another example of a method for making a fibrous structure of the present disclosure, the method comprises the steps of:

(a) providing a fibrous furnish comprising fibers;
(b) depositing the fibrous furnish onto a foraminous member to form an embryonic fibrous web;
(c) associating the embryonic fibrous web with a papermaking belt having a pattern of knuckles as disclosed herein such that at a portion of the fibers are deflected out-of-plane of the other fibers present in the embryonic fibrous web; and
(d) drying said embryonic fibrous web such that that the dried fibrous structure is formed.

In another example of a method for making the fibrous structures of the present disclosure, the method can comprise the steps of:

(a) providing a fibrous furnish comprising fibers;
(b) depositing the fibrous furnish onto a foraminous member such that an embryonic fibrous web is formed;
(c) associating the embryonic web with a papermaking belt having a pattern of knuckles as disclosed herein such that at a portion of the fibers can be formed in the substantially continuous deflection conduits;
(d) deflecting a portion of the fibers in the embryonic fibrous web into the substantially continuous deflection conduits and removing water from the embryonic web so as to form an intermediate fibrous web under such conditions that the deflection of fibers is initiated no later than the time at which the water removal through the discrete deflection cells or the substantially continuous deflection conduits is initiated; and (e) optionally, drying the intermediate fibrous web; and (f) optionally, foreshortening the intermediate fibrous web, such as by creping.

Figure 9:
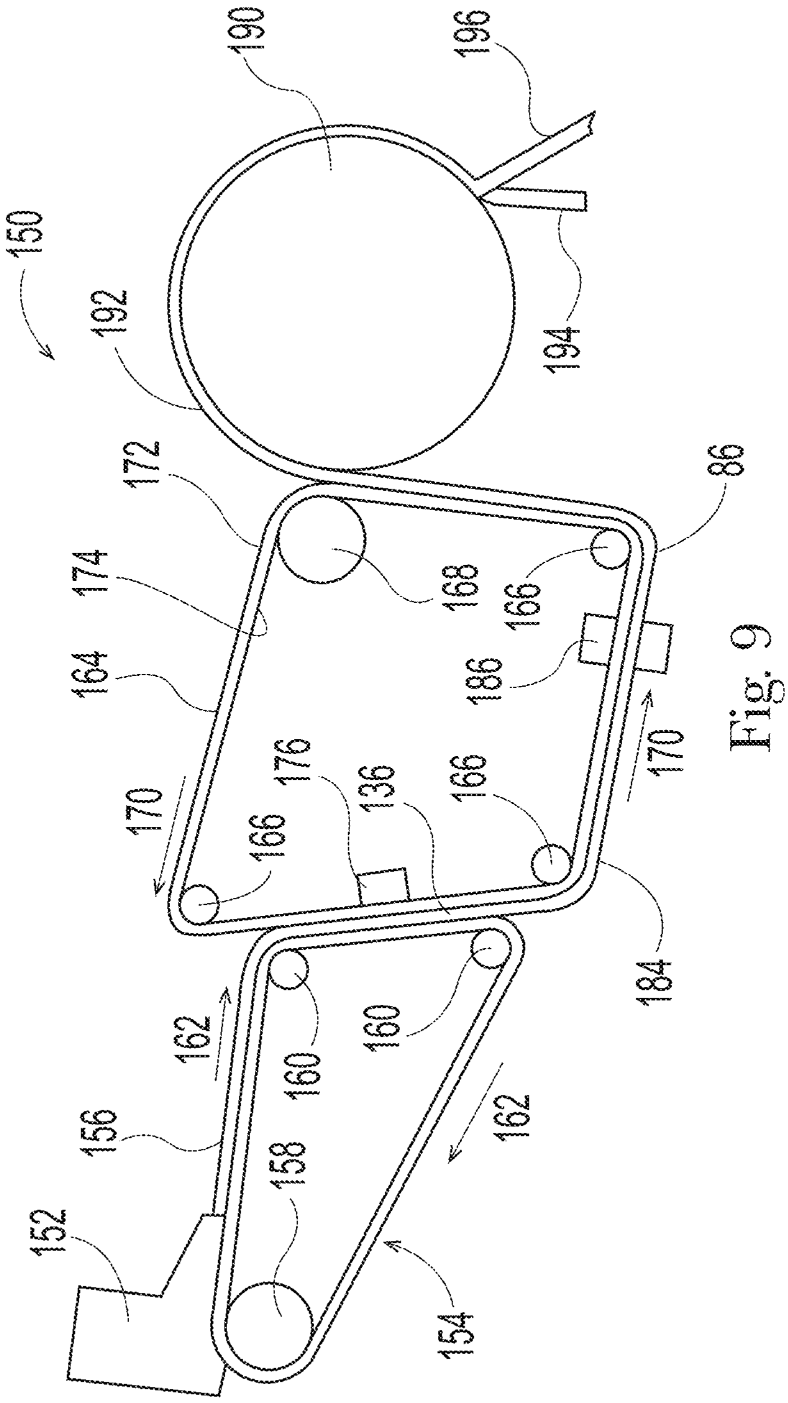
FIG. 9 is a schematic representation of one method for making the new fibrous structures detailed herein.

FIG. 9 is a simplified, schematic representation of one example of a continuous fibrous structure making process and machine useful in the practice of the present disclosure. The following description of the process and machine include non-limiting examples of process parameters useful for making a fibrous structure of the present invention.

As shown in FIG. 9, process and equipment 150 for making fibrous structures according to the present disclosure comprises supplying an aqueous dispersion of fibers (a fibrous furnish) to a headbox 152 which can be of any design known to those of skill in the art. The aqueous dispersion of fibers can include wood and non-wood fibers, northern softwood kraft fibers ("NSK"), *Eucalyptus* fibers, SSK, NHK, acacia, bamboo, straw and bast fibers (wheat, flax, rice, barley, etc.), corn stalks, bagasse, reed, synthetic fibers (PP, PET, PE, bico version of such fibers), regenerated cellulose fibers (viscose, lyocell, etc.), and other fibers known in the papermaking art. From the headbox 152, the aqueous dispersion of fibers can be delivered to a foraminous member 154, which can be a Fourdrinier wire, to produce an embryonic fibrous web 156.

The foraminous member 154 can be supported by a breast roll 158 and a plurality of return rolls 160 of which only two are illustrated. The foraminous member 154 can be propelled in the direction indicated by directional arrow 162 by a drive means, not illustrated, at a predetermined velocity, $V_1$. Optional auxiliary units and/or devices commonly associated with fibrous structure making machines and with the foraminous member 154, but not illustrated, comprise forming boards, hydrofoils, vacuum boxes, tension rolls, support rolls, wire cleaning showers, and other various components known to those of skill in the art.

After the aqueous dispersion of fibers is deposited onto the foraminous member 154, the embryonic fibrous web 156 is formed, typically by the removal of a portion of the aqueous dispersing medium by techniques known to those skilled in the art. Vacuum boxes, forming boards, hydrofoils, and other various equipment known to those of skill in the art are useful in effectuating water removal. The embryonic fibrous web 156 can travel with the foraminous member 154 about return roll 160 and can be brought into contact with a papermaking belt 164 in a transfer zone 136, after which the embryonic fibrous web travels on the papermaking belt 164. While in contact with the papermaking belt 164, the embryonic fibrous web 156 can be deflected, rearranged, and/or further dewatered. Depending on the process, mechanical and fluid pressure differential, alone or in combination, can be utilized to deflect a portion of fibers into the deflection conduits of the papermaking belt. For example, in a through-air drying process a vacuum apparatus 176 can apply a fluid pressure differential to the embryonic web 156 disposed on the papermaking belt 164, thereby deflecting fibers into the deflection conduits of the deflection member. The process of deflection may be continued with additional vacuum pressure 186, if necessary, to even further deflect and dewater the fibers of the web 184 into the deflection conduits of the papermaking belt 164.

The papermaking belt 164 can be in the form of an endless belt. In this simplified representation, the papermaking belt 164 passes around and about papermaking belt return rolls 166 and impression nip roll 168 and can travel in the direction indicated by directional arrow 170, at a papermaking belt velocity $V_2$, which can be less than, equal to, or greater than, the foraminous member velocity $V_1$. In the present disclosure, the papermaking belt velocity $V_2$ is less than foraminous member velocity $V_1$ such that the partially-dried fibrous web is foreshortened in the transfer zone 136 by a percentage determined by the relative velocity differential between the foraminous member and the papermaking belt. Associated with the papermaking belt 164, but not illustrated, can be various support rolls, other return rolls, cleaning means, drive means, and other various equipment known to those of skill in the art that may be commonly used in fibrous structure making machines.

The papermaking belts 164 of the present disclosure can be made, or partially made, according to the process described in U.S. Pat. No. 4,637,859, issued Jan. 20, 1987, to Trokhan, and having the patterns of cells as disclosed herein.

The fibrous web 192 can then be creped with a creping blade 194 to remove the web 192 from the surface of the Yankee dryer 190 resulting in the production of a creped fibrous structure 196 in accordance with the present disclosure. As used herein, creping refers to the reduction in length of a dry (having a consistency of at least about 90% and/or at least about 95%) fibrous web which occurs when energy is applied to the dry fibrous web in such a way that the length of the fibrous web is reduced and the fibers in the fibrous web are rearranged with an accompanying disruption of fiber-fiber bonds. Creping can be accomplished in any of several ways as is well known in the art, as the doctor blades can be set at various angles. The creped fibrous structure 196 is wound on a reel, commonly referred to as a parent roll, and can be subjected to post processing steps such as calendaring, tuft generating operations, embossing, and/or converting. The reel winds the creped fibrous structure at a reel surface velocity, $V_4$.

The papermaking belts of the present disclosure can be utilized to form discrete elements and a continuous/substantially continuous network (i.e., knuckles and pillows) into a fibrous structure during a through-air-drying operation. The discrete elements can be knuckles and can be relatively high density relative to the continuous/substantially continuous network, which can be a continuous/substantially pillow having a relatively lower density. In other examples, the discrete elements can be pillows and can be relatively low density relative to the continuous/substantially continuous network, which can be a continuous/substantially continuous knuckle having a relatively higher density. In the example detailed above, the fibrous structure is a homogenous fibrous structure, but such papermaking process may also be adapted to manufacture layered fibrous structures, as is known in the art.

As discussed above, the fibrous structure can be embossed during a converting operating to produce the embossed fibrous structures of the present disclosure.

An example of fibrous structures in accordance with the present disclosure can be prepared using a papermaking machine as described above with respect to FIG. 9, and according to the method described below:

A 3% by weight aqueous slurry of northern softwood kraft (NSK) pulp is made up in a conventional re-pulper. The NSK slurry is refined gently and a 2% solution of a permanent wet strength resin (i.e. Kymene 5221 marketed by Solenis incorporated of Wilmington, Del.) is added to the NSK stock pipe at a rate of 1% by weight of the dry fibers.

Kymene 5221 is added as a wet strength additive. The adsorption of Kymene 5221 to NSK is enhanced by an in-line mixer. A 1% solution of Carboxy Methyl Cellulose (CMC) (i.e. FinnFix 700 marketed by C.P. Kelco U.S. Inc. of Atlanta, GA) is added after the in-line mixer at a rate of 0.2% by weight of the dry fibers to enhance the dry strength of the fibrous substrate. A 3% by weight aqueous slurry of hardwood *Eucalyptus* fibers is made up in a conventional re-pulper. A 1% solution of defoamer (i.e. BuBreak 4330 marketed by Buckman Labs, Memphis TS) is added to the *Eucalyptus* stock pipe at a rate of 0.25% by weight of the dry fibers and its adsorption is enhanced by an in-line mixer.

The NSK furnish and the *Eucalyptus* fibers are combined in the head box and deposited onto a Fourdrinier wire, running at a first velocity $V_1$, homogenously to form an embryonic web. The web is then transferred at the transfer zone from the Fourdrinier forming wire at a fiber consistency of about 15% to the papermaking belt, the papermaking belt moving at a second velocity, $V_2$. The papermaking belt has a pattern of raised portions (i.e., knuckles) extending from a reinforcing member, the raised portions defining either a plurality of discrete or a continuous/substantially continuous deflection conduit portion, as described herein, particularly with reference to the masks of FIGS. 5-8. The transfer occurs in the transfer zone without precipitating substantial densification of the web. The web is then forwarded, at the second velocity, $V_2$, on the papermaking belt along a looped path in contacting relation with a transfer head disposed at the transfer zone, the second velocity being from about 1% to about 40% slower than the first velocity, $V_1$. Since the Fourdrinier wire speed is faster than the papermaking belt, wet shortening, i.e., foreshortening, of the web occurs at the transfer point. In an example, the second velocity $V_2$ can be from about 0% to about 5% faster than the first velocity $V_1$.

Further de-watering is accomplished by vacuum assisted drainage until the web has a fiber consistency of about 15% to about 30%. The patterned web is pre-dried by air blow-through, i.e., through-air-drying (TAD), to a fiber consistency of about 65% by weight. The web is then adhered to the surface of a Yankee dryer with a sprayed creping adhesive comprising 0.25% aqueous solution of polyvinyl alcohol (PVA). The fiber consistency is increased to an estimated 95%-97% before dry creping the web with a doctor blade. The doctor blade has a bevel angle of about 45 degrees and is positioned with respect to the Yankee dryer to provide an impact angle of about 101 degrees. This doctor blade position permits the adequate amount of force to be applied to the substrate to remove it off the Yankee while minimally disturbing the previously generated web structure. The dried web is reeled onto a take up roll (known as a parent roll), the surface of the take up roll moving at a fourth velocity, $V_4$, that is faster than the third velocity, $V_3$, of the Yankee dryer. By reeling at a fourth velocity, $V_4$, that is about 1% to 20% faster than the third velocity, $V_3$, some of the foreshortening provided by the creping step is "pulled out," sometimes referred to as a "positive draw," so that the paper can be more stable for any further converting operations. In other examples, a "negative draw" as is known in the art is also contemplated.

Two plies of the web can be formed into paper towel products by embossing and laminating them together using PVA adhesive. The paper towel has about 53 g/m$^2$ basis weight and contains 65% by weight Northern Softwood Kraft and 35% by weight *Eucalyptus* furnish. The sanitary tissue product is soft, flexible and absorbent.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, and/or single or multi-ply products. All tests are conducted in such conditioned room. Do not test samples that have defects such as wrinkles, tears, holes, and like. All instruments are calibrated according to manufacturer's specifications.

Basis Weight:

Basis weight of a fibrous structure and/or sanitary tissue product is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 ft$^2$ or g/m$^2$ as follows:

Basis Weight=(Mass of stack)/[(Area of 1square in stack)×(No. of squares in stack)]

For example:

Basis Weight (lbs/3000 ft$^2$)=[[Mass of stack(g)/453.6 (g/lbs)]/[12.25 (in$^2$)/144 (in$^2$/ft$^2$)×12]]×3000 or,

Basis Weight (g/m$^2$)=Mass of stack (g)/[79.032 (cm$^2$)/10,000 (cm$^2$/m$^2$)×12].

Report the numerical result to the nearest 0.1 lbs/3000 ft$^2$ or 0.1 g/m$^2$. Sample dimensions can be changed or varied using a similar precision cutter as mentioned above, so as at least 100 square inches of sample area in stack.

Emtec Test Method:

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2 C° and 50%±2%) for at least 1 hour prior to conducting the TSA testing, which is also conducted under TAPPI conditions.

Testing Procedure

Calibrate the instrument according to the manufacturer's instructions using the 1-point calibration method with Emtec reference standards ("ref.2 samples"). If these reference samples are no longer available, use the appropriate reference samples provided by the manufacturer. Calibrate the instrument according to the manufacturer's recommendation and instruction, so that the results will be comparable to those obtained when using the 1-point calibration method with Emtec reference standards ("ref.2 samples").

Mount the test sample into the instrument and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms.

SST Absorbency Rate:

This test incorporates the Slope of the Square Root of Time (SST) Test Method. The SST method measures rate over a wide spectrum of time to capture a view of the product pick-up rate over the useful lifetime. In particular, the method measures the absorbency rate via the slope of the mass versus the square root of time from 2-15 seconds.

Overview

The absorption (wicking) of water by a fibrous sample is measured over time. A sample is placed horizontally in the instrument and is supported with minimal contact during testing (without allowing the sample to droop) by an open weave net structure that rests on a balance. The test is initiated when a tube connected to a water reservoir is raised and the meniscus makes contact with the center of the sample from beneath, at a small negative pressure. Absorption is controlled by the ability of the sample to pull the water from the instrument for approximately 20 seconds. Rate is determined as the slope of the regression line of the outputted weight vs sqrt(time) from 2 to 15 seconds.

Apparatus

Conditioned Room—Temperature is controlled from 73° F.±2° F. (23° C.±1° C.). Relative Humidity is controlled from 50%±2%

Sample Preparation—Product samples are cut using hydraulic/pneumatic precision cutter into 3.375 inch diameter circles.

Capacity Rate Tester (CRT)—The CRT is an absorbency tester capable of measuring capacity and rate. The CRT consists of a balance (0.001 g), on which rests on a woven grid (using nylon monofilament line having a 0.014" diameter) placed over a small reservoir with a delivery tube in the center. This reservoir is filled by the action of solenoid valves, which help to connect the sample supply reservoir to an intermediate reservoir, the water level of which is monitored by an optical sensor. The CRT is run with a −2 mm water column, controlled by adjusting the height of water in the supply reservoir.

Figure 12:
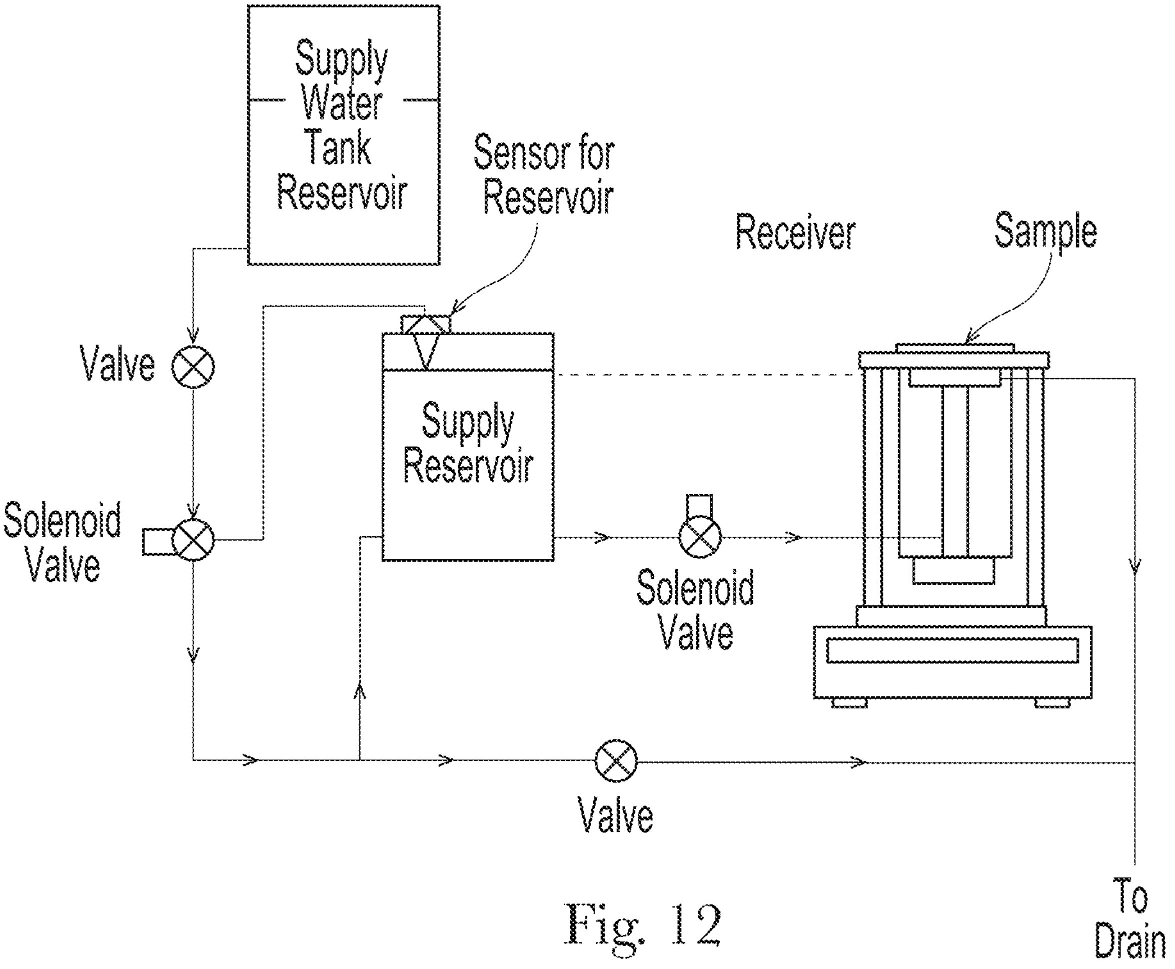
FIG. 12 is a diagram of a SST Test Method set up.

A diagram of the testing apparatus set up is shown in FIG. 12.

Software—LabView based custom software specific to CRT Version 4.2 or later.

Water—Distilled water with conductivity <10 μS/cm (target <5 μS/cm) @ 25° C.

Sample Preparation

For this method, a usable unit is described as one finished product unit regardless of the number of plies. Condition all samples with packaging materials removed for a minimum of 2 hours prior to testing. Discard at least the first ten usable units from the roll. Remove two usable units and cut one 3.375-inch circular sample from the center of each usable unit for a total of 2 replicates for each test result. Do not test samples with defects such as wrinkles, tears, holes, etc. Replace with another usable unit which is free of such defects Sample Testing Pre-Test Set-Up 1. The water height in the reservoir tank is set −2.0 mm below the top of the support rack (where the towel sample will be placed).
2. The supply tube (8 mm I.D.) is centered with respect to the support net.
3. Test samples are cut into circles of 3⅜" diameter and equilibrated at Tappi environment conditions for a minimum of 2 hours.

Test Description

1. After pressing the start button on the software application, the supply tube moves to 0.33 mm below the water height in the reserve tank. This creates a small meniscus of water above the supply tube to ensure test initiation. A valve between the tank and the supply tube closes, and the scale is zeroed.
2. The software prompts you to "load a sample". A sample is placed on the support net, centering it over the supply tube, and with the side facing the outside of the roll placed downward.
3. Close the balance windows and press the "OK" button—the software records the dry weight of the circle.
4. The software prompts you to "place cover on sample". The plastic cover is placed on top of the sample, on top of the support net. The plastic cover has a center pin (which is flush with the outside rim) to ensure that the sample is in the proper position to establish hydraulic connection. Four other pins, 1 mm shorter in depth, are positioned 1.25-1.5 inches radially away from the center pin to ensure the sample is flat during the test. The sample cover rim should not contact the sheet. Close the top balance window and click "OK".
5. The software re-zeroes the scale and then moves the supply tube towards the sample. When the supply tube reaches its destination, which is 0.33 mm below the support net, the valve opens (i.e., the valve between the reserve tank and the supply tube), and hydraulic connection is established between the supply tube and the sample. Data acquisition occurs at a rate of 5 Hz and is started about 0.4 seconds before water contacts the sample.

6. The test runs for at least 20 seconds. After this, the supply tube pulls away from the sample to break the hydraulic connection.
7. The wet sample is removed from the support net. Residual water on the support net and cover are dried with a paper towel.
8. Repeat until all samples are tested.
9. After each test is run, a *.txt file is created (typically stored in the CRT/data/rate directory) with a file name as typed at the start of the test. The file contains all the test set-up parameters, dry sample weight, and cumulative water absorbed (g) vs. time (sec) data collected from the test.

Calculation of Rate of Uptake

Take the raw data file that includes time and weight data.

First, create a new time column that subtracts 0.4 seconds from the raw time data to adjust the raw time data to correspond to when initiation actually occurs (about 0.4 seconds after data collection begins).

Second, create a column of data that converts the adjusted time data to square root of time data (e.g., using a formula such as SQRT(within Excel).

Third, calculate the slope of the weight data vs the square root of time data (e.g., using the SLOPE( ) function within Excel, using the weight data as the y-data and the sqrt(time) data as the x-data, etc.). The slope should be calculated for the data points from 2 to 15 seconds, inclusive (or 1.41 to 3.87 in the sqrt(time) data column).

Calculation of Slope of the Square Root of Time (SST)

The start time of water contact with the sample is estimated to be 0.4 seconds after the start of hydraulic connection is established between the supply tube and the sample (CRT Time). This is because data acquisition begins while the tube is still moving towards the sample and incorporates the small delay in scale response. Thus, "time zero" is actually at 0.4 seconds in CRT Time as recorded in the *.txt file.

The slope of the square root of time (SST) from 2-15 seconds is calculated from the slope of a linear regression line from the square root of time between (and including) 2 to 15 seconds (x-axis) versus the cumulative grams of water absorbed. The units are g/sec$^{0.5}$.

Reporting Results

Report the average slope to the nearest 0.01 g/s$^{0.5}$.

Plate Stiffness Test Method:

As used herein, the "Plate Stiffness" test is a measure of stiffness of a flat sample as it is deformed downward into a hole beneath the sample. For the test, the sample is modeled as an infinite plate with thickness "t" that resides on a flat surface where it is centered over a hole with radius "R". A central force "F" applied to the tissue directly over the center of the hole deflects the tissue down into the hole by a distance "w". For a linear elastic material, the deflection can be predicted by:

$$w = \frac{3F}{4\pi Et^3}(1-v)(3+v)R^2$$

where "E" is the effective linear elastic modulus, "v" is the Poisson's ratio, "R" is the radius of the hole, and "t" is the thickness of the tissue, taken as the caliper in millimeters measured on a stack of 5 tissues under a load of about 0.29 psi. Taking Poisson's ratio as 0.1 (the solution is not highly sensitive to this parameter, so the inaccuracy due to the assumed value is likely to be minor), the previous equation can be rewritten for "w" to estimate the effective modulus as a function of the flexibility test results:

$$E \approx \frac{3R^2}{4t^3}\frac{F}{w}$$

The test results are carried out using an MTS Alliance RT/1, Insight Renew, or similar model testing machine (MTS Systems Corp., Eden Prairie, Minn.), with a 50 newton load cell, and data acquisition rate of at least 25 force points per second. As a stack of five tissue sheets (created without any bending, pressing, or straining) at least 2.5-inches by 2.5 inches, but no more than 5.0 inches by 5.0 inches, oriented in the same direction, sits centered over a hole of radius 15.75 mm on a support plate, a blunt probe of 3.15 mm radius descends at a speed of 20 mm/min. For typical perforated rolled bath tissue, sample preparation consists of removing five (5) connected usable units, and carefully forming a 5 sheet stack, accordion style, by bending only at the perforation lines. When the probe tip descends to 1 mm below the plane of the support plate, the test is terminated. The maximum slope (using least squares regression) in grams of force/mm over any 0.5 mm span during the test is recorded (this maximum slope generally occurs at the end of the stroke). The load cell monitors the applied force and the position of the probe tip relative to the plane of the support plate is also monitored. The peak load is recorded, and "E" is estimated using the above equation.

The Plate Stiffness "S" per unit width can then be calculated as:

$$S = \frac{Et^3}{12}$$

and is expressed in units of Newtons*millimeters. The Testworks program uses the following formula to calculate stiffness (or can be calculated manually from the raw data output):

$$S = \left(\frac{F}{w}\right)\left[\frac{(3+v)R^2}{16\pi}\right]$$

wherein "F/w" is max slope (force divided by deflection), "v" is Poisson's ratio taken as 0.1, and "R" is the ring radius.

The same sample stack (as used above) is then flipped upside down and retested in the same manner as previously described. This test is run three more times (with different sample stacks). Thus, eight S values are calculated from four 5-sheet stacks of the same sample. The numerical average of these eight S values is reported as Plate Stiffness for the sample.

Stack Compressibility and Resilient Bulk Test Method:

Stack thickness (measured in mils, 0.001 inch) is measured as a function of confining pressure (g/in$^2$) using a Thwing-Albert (14 W. Collings Ave., West Berlin, NJ)

Vantage Compression/Softness Tester (model 1750-2005 or similar) or equivalent instrument, equipped with a 2500 g load cell (force accuracy is +/−0.25% when measuring value is between 10%-100% of load cell capacity, and 0.025% when measuring value is less than 10% of load cell capacity), a 1.128 inch diameter steel pressure foot (one square inch cross sectional area) which is aligned parallel to the steel anvil (2.5 inch diameter). The pressure foot and anvil surfaces must be clean and dust free, particularly when performing the steel-to-steel test. Thwing-Albert software (MAP) controls the motion and data acquisition of the instrument.

The instrument and software are set-up to acquire crosshead position and force data at a rate of 50 points/sec. The crosshead speed (which moves the pressure foot) for testing samples is set to 0.20 inches/min (the steel-to-steel test speed is set to 0.05 inches/min). Crosshead position and force data are recorded between the load cell range of approximately 5 and 1500 grams during compression. The crosshead is programmed to stop immediately after surpassing 1500 grams, record the thickness at this pressure (termed $T_{max}$), and immediately reverse direction at the same speed as performed in compression. Data is collected during this decompression portion of the test (also termed recovery) between approximately 1500 and 5 grams. Since the foot area is one square inch, the force data recorded corresponds to pressure in units of $g/in^2$. The MAP software is programmed to the select 15 crosshead position values (for both compression and recovery) at specific pressure trap points of 10, 25, 50, 75, 100, 125, 150, 200, 300, 400, 500, 600, 750, 1000, and 1250 $g/in^2$ (i.e., recording the crosshead position of very next acquired data point after the each pressure point trap is surpassed). In addition to these 30 collected trap points, $T_{max}$ is also recorded, which is the thickness at the maximum pressure applied during the test (approximately 1500 $g/in^2$).

Since the overall test system, including the load cell, is not perfectly rigid, a steel-to-steel test is performed (i.e., nothing in between the pressure foot and anvil) at least twice for each batch of testing, to obtain an average set of steel-to-steel crosshead positions at each of the 31 trap points described above. This steel-to-steel crosshead position data is subtracted from the corresponding crosshead position data at each trap point for each tested stacked sample, thereby resulting in the stack thickness (mils) at each pressure trap point during the compression, maximum pressure, and recovery portions of the test.

$$StackT(trap)=StackCP(trap)-SteelCP(trap)$$

Where:

trap=trap point pressure at either compression, recovery, or max

StackT=Thickness of Stack (at trap pressure)

StackCP=Crosshead position of Stack in test (at trap pressure)

SteelCP=Crosshead position of steel-to-steel test (at trap pressure)

A stack of five (5) usable units thick is prepared for testing as follows. The minimum usable unit size is 2.5 inch by 2.5 inch; however a larger sheet size is preferable for testing, since it allows for easier handling without touching the central region where compression testing takes place. For typical perforated rolled bath tissue, this consists of removing five (5) sets of 3 connected usable units. In this case, testing is performed on the middle usable unit, and the outer 2 usable units are used for handling while removing from the roll and stacking. For other product formats, it is advisable, when possible, to create a test sheet size (each one usable unit thick) that is large enough such that the inner testing region of the created 5 usable unit thick stack is never physically touched, stretched, or strained, but with dimensions that do not exceed 14 inches by 6 inches.

The 5 sheets (one usable unit thick each) of the same approximate dimensions, are placed one on top the other, with their MD aligned in the same direction, their outer face all pointing in the same direction, and their edges aligned +/−3 mm of each other. The central portion of the stack, where compression testing will take place, is never to be physically touched, stretched, and/or strained (this includes never to 'smooth out' the surface with a hand or other apparatus prior to testing).

The 5 sheet stack is placed on the anvil, positioning it such that the pressure foot will contact the central region of the stack (for the first compression test) in a physically untouched spot, leaving space for a subsequent (second) compression test, also in the central region of the stack, but separated by ¼ inch or more from the first compression test, such that both tests are in untouched, and separated spots in the central region of the stack. From these two tests, an average crosshead position of the stack at each trap pressure (i.e., StackCP(trap)) is calculated for compression, maximum pressure, and recovery portions of the tests. Then, using the average steel-to-steel crosshead trap points (i.e., SteelCP(trap)), the average stack thickness at each trap (i.e., StackT(trap) is calculated (mils).

Stack Compressibility is defined here as the absolute value of the linear slope of the stack thickness (mils) as a function of the log(10) of the confining pressure (grams/$in^2$), by using the 15 compression trap points discussed previously (i.e., compression from 10 to 1250 $g/in^2$), in a least squares regression. The units for Stack Compressibility are [mils/(log(g/$in^2$))], and is reported to the nearest 0.1 [mils/(log(g/$in^2$))].

Resilient Bulk is calculated from the stack weight per unit area and the sum of 8 StackT(trap) thickness values from the maximum pressure and recovery portion of the tests: i.e., at maximum pressure ($T_{max}$) and recovery trap points at R1250, R1000, R750, R500, R300, R100, and R10 $g/in^2$ (a prefix of "R" denotes these traps come from recovery portion of the test). Stack weight per unit area is measured from the same region of the stack contacted by the compression foot, after the compression testing is complete, by cutting a 3.50 inch square (typically) with a precision die cutter, and weighing on a calibrated 3-place balance, to the nearest 0.001 gram. The weight of the precisely cut stack, along with the StackT(trap) data at each required trap pressure (each point being an average from the two compression/recovery tests discussed previously), are used in the following equation to calculate Resilient Bulk, reported in units of $cm^3/g$, to the nearest 0.1 $cm^3/g$.

$$\text{Resilient Bulk} = \frac{\text{SUM}(StackT(T_{max}, R1250, R1000, R750, R500, R300, R100, R10)) * 0.00254}{M/A}$$

Where:

StackT=Thickness of Stack (at trap pressures of $T_{max}$ and recovery pressures listed above), (mils)

M=weight of precisely cut stack, (grams)

A=area of the precisely cut stack, ($cm^2$)

Wet Burst:

"Wet Burst Strength" as used herein is a measure of the ability of a fibrous structure and/or a fibrous structure product incorporating a fibrous structure to absorb energy, when wet and subjected to deformation normal to the plane of the fibrous structure and/or fibrous structure product. The Wet Burst Test is run according to ISO 12625-9:2005, except for any deviations or modifications described below.

Wet burst strength may be measured using a Thwing-Albert Burst Tester Cat. No. 177 equipped with a 2000 g load cell commercially available from Thwing-Albert Instrument Company, Philadelphia, Pa, or an equivalent instrument.

Wet burst strength is measured by preparing four (4) multi-ply fibrous structure product samples for testing. First, condition the samples for two (2) hours at a temperature of 73° F.±2° F. (23° C.±1° C.) and a relative humidity of 50% (±2%). Take one sample and horizontally dip the center of the sample into a pan filled with about 25 mm of room temperature distilled water. Leave the sample in the water four (4) (±0.5) seconds. Remove and drain for three (3) (±0.5) seconds holding the sample vertically so the water runs off in the cross-machine direction. Proceed with the test immediately after the drain step.

Place the wet sample on the lower ring of the sample holding device of the Burst Tester with the outer surface of the sample facing up so that the wet part of the sample completely covers the open surface of the sample holding ring. If wrinkles are present, discard the samples and repeat with a new sample. After the sample is properly in place on the lower sample holding ring, turn the switch that lowers the upper ring on the Burst Tester. The sample to be tested is now securely gripped in the sample holding unit. Start the burst test immediately at this point by pressing the start button on the Burst Tester. A plunger will begin to rise (or lower) toward the wet surface of the sample. At the point when the sample tears or ruptures, report the maximum reading. The plunger will automatically reverse and return to its original starting position. Repeat this procedure on three (3) more samples for a total of four (4) tests, i.e., four (4) replicates. Report the results as an average of the four (4) replicates, to the nearest gram.

Wet Tensile:

Wet Elongation, Tensile Strength, and TEA are measured on a constant rate of extension tensile tester with computer interface (a suitable instrument is the EJA Vantage from the Thwing-Albert Instrument Co. West Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing Albert) take a CD stack and cut one, 1.00 in±0.01 in wide by at least 3.0 in long stack of strips (long dimension in CD). In like fashion cut the remaining stack in the MD (strip long dimension in MD), to give a total of 8 specimens, four CD and four MD strips. Each strip to be tested is one usable unit thick, and will be treated as a unitary specimen for testing.

Program the tensile tester to perform an extension test (described below), collecting force and extension data at an acquisition rate of 100 Hz as the crosshead raises at a rate of 2.00 in/min (10.16 cm/min) until the specimen breaks. The break sensitivity is set to 50%, i.e., the test is terminated when the measured force drops below 50% of the maximum peak force, after which the crosshead is returned to its original position.

Set the gage length to 2.00 inches. Zero the crosshead and load cell. Insert the specimen into the upper and lower open grips such that at least 0.5 inches of specimen length is contained each grip. Align the specimen vertically within the upper and lower jaws, then close the upper grip. Verify the specimen is hanging freely and aligned with the lower grip, then close the lower grip. Initiate the first portion of the test, which pulls the specimen at a rate of 0.5 in/min, then stops immediately after a load of 10 grams is achieved. Using a pipet, thoroughly wet the specimen with DI water to the point where excess water can be seen pooling on the top of the lower closed grip. Immediately after achieving this wetting status, initiate the second portion of the test, which pulls the wetted strip at 2.0 in/min until break status is achieved. Repeat testing in like fashion for all four CD and four MD specimens.

Program the software to calculate the following from the constructed force (g) verses extension (in) curve:

Wet Tensile Strength (g/in) is the maximum peak force (g) divided by the specimen width (1 in), and reported as g/in to the nearest 0.1 g/in.

Adjusted Gage Length (in) is calculated as the extension measured (from original 2.00 inch gage length) at 3 g of force during the test following the wetting of the specimen (or the next data point after 3 g force) added to the original gage length (in). If the load does not fall below 3 g force during the wetting procedure, then the adjusted gage length will be the extension measured at the point the test is resumed following wetting added to the original gage length (in).

Wet Peak Elongation (%) is calculated as the additional extension (in) from the Adjusted Gage Length (in) at the maximum peak force point (more specifically, at the last maximum peak force point, if there is more than one) divided by the Adjusted Gage Length (in) multiplied by 100 and reported as % to the nearest 0.1%.

Wet Peak Tensile Energy Absorption (TEA, $g*in/in^2$) is calculated as the area under the force curve ($g*in^2$) integrated from zero extension (i.e., the Adjusted Gage Length) to the extension at the maximum peak force elongation point (more specifically, at the last maximum peak force point, if there is more than one) (in), divided by the product of the adjusted Gage Length (in) and specimen width (in). This is reported as $g*in/in^2$ to the nearest 0.01 $g*in/in^2$.

The Wet Tensile Strength (g/in), Wet Peak Elongation (%), Wet Peak TEA ($g*in/in^2$ are calculated for the four CD specimens and the four MD specimens. Calculate an average for each parameter separately for the CD and MD specimens.

Calculations

Geometric Mean Initial Wet Tensile Strength=Square Root of [MD Wet Tensile Strength (g/in)×CD Wet Tensile Strength (g/in)]

Geometric Mean Wet Peak Elongation=Square Root of [MD Wet Peak Elongation (%)×CD Wet Peak Elongation (%)]

Geometric Mean Wet Peak TEA=Square Root of [MD Wet Peak TEA ($g*in/in^2$)×CD Wet Peak TEA ($g*in/in^2$)]

Total Wet Tensile(TWT)=MD Wet Tensile Strength (g/in)+CD Wet Tensile Strength (g/in)

Total Wet Peak TEA=MD Wet Peak TEA ($g*in/in^2$)+ CD Wet Peak TEA ($g*in/in^2$)

Wet Tensile Ratio=MD Wet Peak Tensile Strength (g/in)/CD Wet Peak Tensile Strength (g/in)

Flexural Rigidity:

This test is performed on 1 inch×6 inch (2.54 cm×15.24 cm) strips of a fibrous structure sample. A Cantilever Bending Tester such as described in ASTM Standard D 1388 (Model 5010, Instrument Marketing Services, Fairfield, NJ) is used and operated at a ramp angle of 41.5±0.5° and a sample slide speed of 0.5±0.2 in/second (1.3±0.5 cm/second). A minimum of n=16 tests are performed on each sample from n=8 sample strips.

No fibrous structure sample which is creased, bent, folded, perforated, or in any other way weakened should ever be tested using this test. A non-creased, non-bent, non-folded, non-perforated, and non-weakened in any other way fibrous structure sample should be used for testing under this test.

From one fibrous structure sample of about 4 inch×6 inch (10.16 cm×15.24 cm), carefully cut using a 1 inch (2.54 cm) JDC Cutter (available from Thwing-Albert Instrument Company, Philadelphia, PA) four (4) 1 inch (2.54 cm) wide by 6 inch (15.24 cm) long strips of the fibrous structure in the MD direction. From a second fibrous structure sample from the same sample set, carefully cut four (4) 1 inch (2.54 cm) wide by 6 inch (15.24 cm) long strips of the fibrous structure in the CD direction. It is important that the cut be exactly perpendicular to the long dimension of the strip. In cutting non-laminated two-ply fibrous structure strips, the strips should be cut individually. The strip should also be free of wrinkles or excessive mechanical manipulation which can impact flexibility. Mark the direction very lightly on one end of the strip, keeping the same surface of the sample up for all strips. Later, the strips will be turned over for testing, thus it is important that one surface of the strip be clearly identified, however, it makes no difference which surface of the sample is designated as the upper surface.

Using other portions of the fibrous structure (not the cut strips), determine the basis weight of the fibrous structure sample in lbs/3000 $ft^2$ and the caliper of the fibrous structure in mils (thousandths of an inch) using the standard procedures disclosed herein. Place the Cantilever Bending Tester level on a bench or table that is relatively free of vibration, excessive heat and most importantly air drafts. Adjust the platform of the Tester to horizontal as indicated by the leveling bubble and verify that the ramp angle is at 41.5±0.5°. Remove the sample slide bar from the top of the platform of the Tester. Place one of the strips on the horizontal platform using care to align the strip parallel with the movable sample slide. Align the strip exactly even with the vertical edge of the Tester wherein the angular ramp is attached or where the zero mark line is scribed on the Tester. Carefully place the sample slide bar back on top of the sample strip in the Tester. The sample slide bar must be carefully placed so that the strip is not wrinkled or moved from its initial position.

Move the strip and movable sample slide at a rate of approximately 0.5±0.2 in/second (1.3±0.5 cm/second) toward the end of the Tester to which the angular ramp is attached. This can be accomplished with either a manual or automatic Tester. Ensure that no slippage between the strip and movable sample slide occurs. As the sample slide bar and strip project over the edge of the Tester, the strip will begin to bend, or drape downward. Stop moving the sample slide bar the instant the leading edge of the strip falls level with the ramp edge. Read and record the overhang length from the linear scale to the nearest 0.5 mm. Record the distance the sample slide bar has moved in cm as overhang length. This test sequence is performed a total of eight (8) times for each fibrous structure in each direction (MD and CD). The first four strips are tested with the upper surface as the fibrous structure was cut facing up. The last four strips are inverted so that the upper surface as the fibrous structure was cut is facing down as the strip is placed on the horizontal platform of the Tester.

The average overhang length is determined by averaging the sixteen (16) readings obtained on a fibrous structure.

$$\text{Overhang Length } MD = \frac{\text{Sum of 8 } MD \text{ readings}}{8}$$

$$\text{Overhang Length } CD = \frac{\text{Sum of 8 } CD \text{ readings}}{8}$$

$$\text{Overhang Length Total} = \frac{\text{Sum of all 16 readings}}{16}$$

$$\text{Bend Length } MD = \frac{\text{Overhang Length } MD}{2}$$

$$\text{Bend Length } CD = \frac{\text{Overhang Length } CD}{2}$$

$$\text{Bend Length Total} = \frac{\text{Overhang Length Total}}{2}$$

$$\text{Flexural Rigidity} = 0.1629 \times W \times C^3$$

wherein W is the basis weight of the fibrous structure in lbs/3000 $ft^2$; C is the bending length (MD or CD or Total) in cm; and the constant 0.1629 is used to convert the basis weight from English to metric units. The results are expressed in mg-cm.

GM Flexural Rigidity=Square root of (MD Flexural Rigidity×CD Flexural Rigidity)

Figure 10:
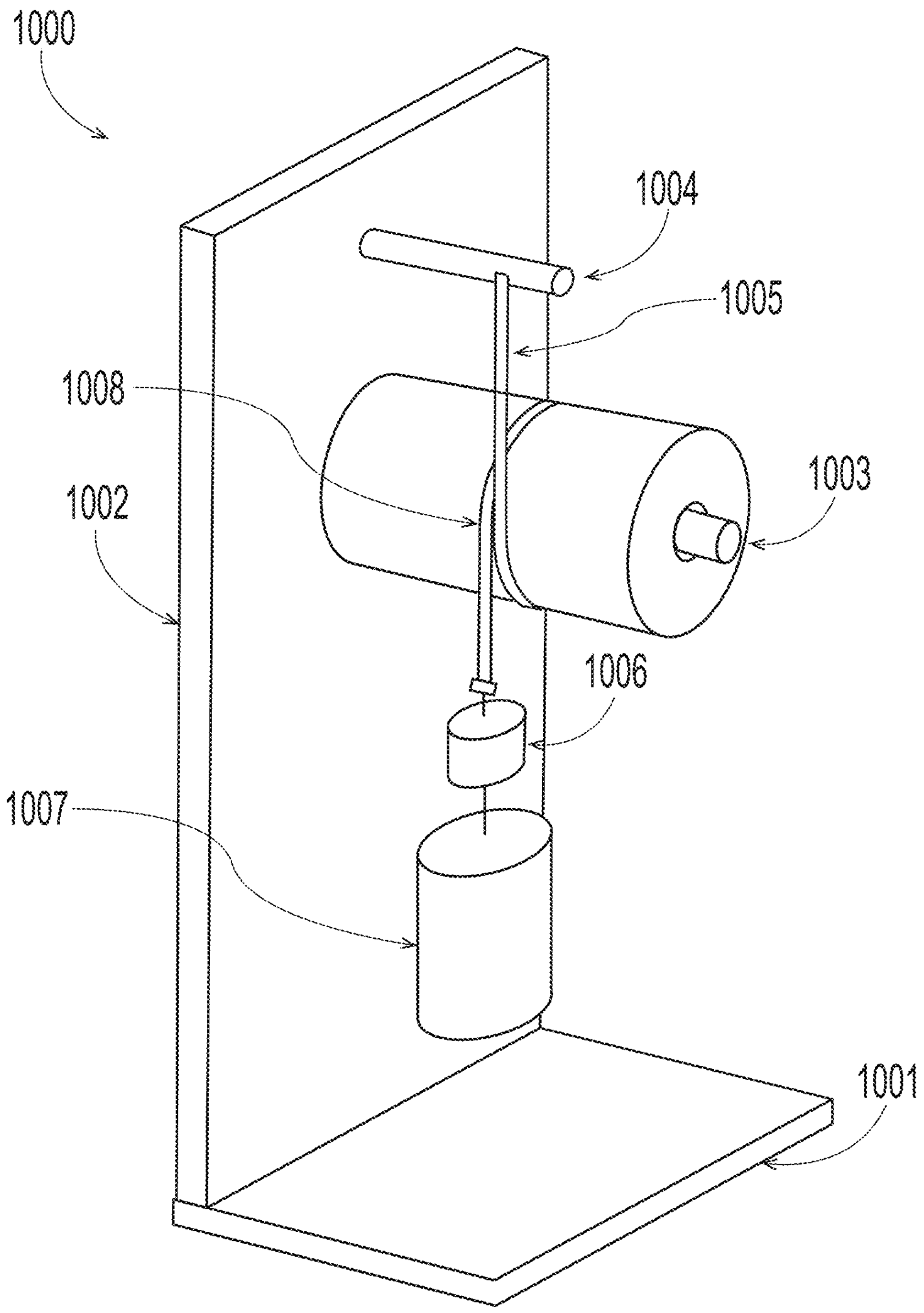
FIG. 10 is a perspective view of a test stand for measuring roll compressibility properties.

Percent Roll Compressibility:

Percent Roll Compressibility (Percent Compressibility) is determined using the Roll Diameter Tester 1000 as shown in FIG. 10. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2 C° and about 50%±2% relative humidity.

The diameter of the test roll is measured directly using a Pi® tape or equivalent precision diameter tape (e.g. an Executive Diameter tape available from Apex Tool Group, LLC, Apex, NC, Model No. W606PD) which converts the circumferential distance into a diameter measurement, so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary the diameter tape is shortened from its original length to a length that allows both of the attached weights to hang freely during the test, yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steal bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2 C° and about 50%±2% relative humidity for 2 hours prior to testing. Rolls with cores that are crushed, bent or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate percent compressibility to the according to the following equation and record to the nearest 0.1%:

$$\%\ \text{Compressibility} = \frac{(\text{Original Roll Diameter}) - (\text{Compressed Roll Diameter})}{\text{Original Roll Diameter}} \times 100$$

Repeat the testing on 10 replicate rolls and record the separate results to the nearest 0.1%. Average the 10 results and report as the Percent Compressibility to the nearest 0.1%.

Roll Firmness:

Roll Firmness is measured on a constant rate of extension tensile tester with computer interface (a suitable instrument is the MTS Alliance using Testworks 4.0 Software, as available from MTS Systems Corp., Eden Prairie, MN) using a load cell for which the forces measured are within 10% to 90% of the limit of the cell. The roll product is held horizontally, a cylindrical probe is pressed into the test roll, and the compressive force is measured versus the depth of penetration. All testing is performed in a conditioned room maintained at 23° C.±2 C° and 50%±2% relative humidity.

Figure 11:
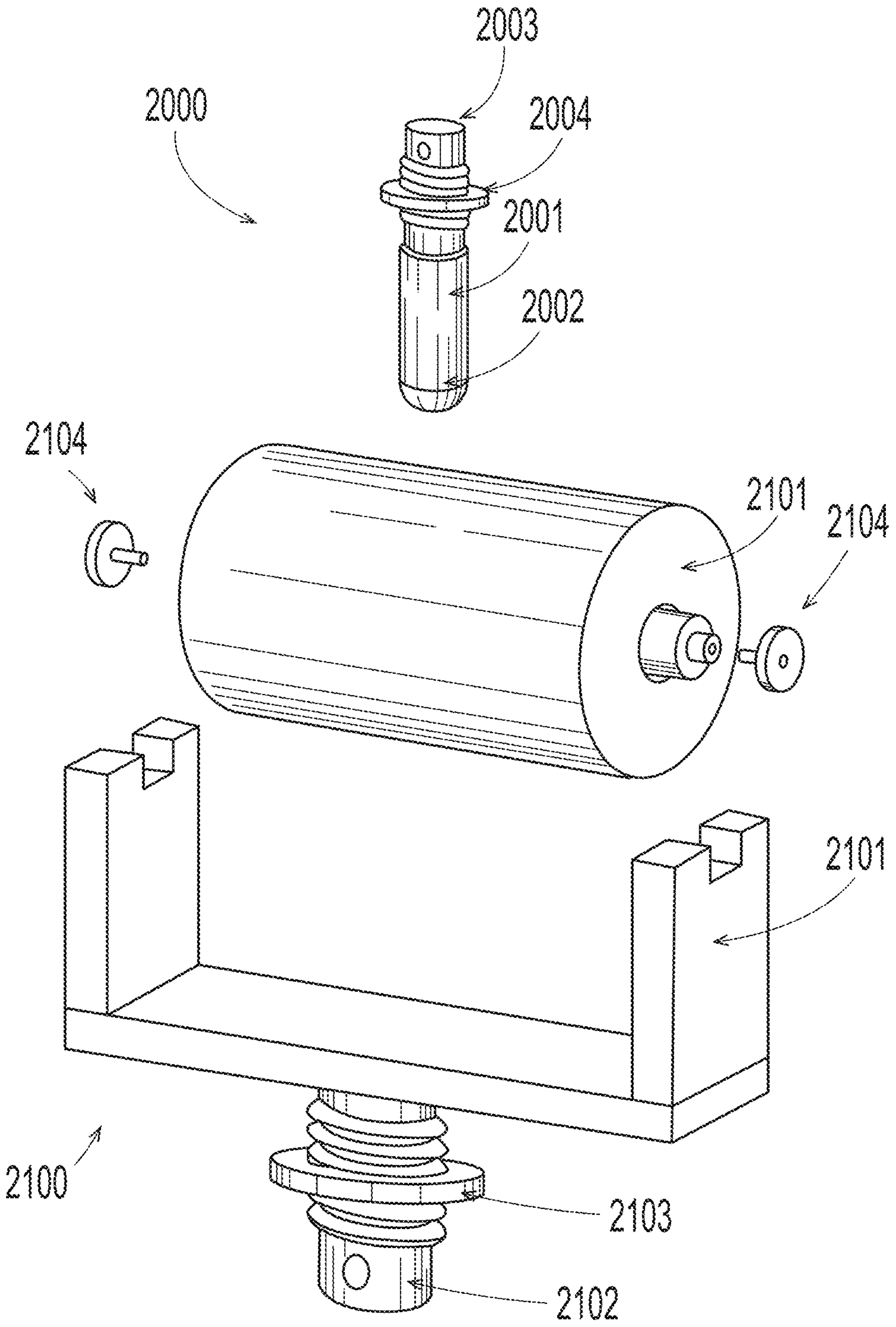
FIG. 11 is perspective view of the testing device used in the roll firmness measurement.

Referring to FIG. 11, the upper movable fixture 2000 consist of a cylindrical probe 2001 made of machined aluminum with a 19.00±0.05 mm diameter and a length of 38 mm. The end of the cylindrical probe 2002 is hemispheric (radius of 9.50±0.05 mm) with the opposing end 2003 machined to fit the crosshead of the tensile tester. The fixture includes a locking collar 2004 to stabilize the probe and maintain alignment orthogonal to the lower fixture. The lower stationary fixture 2100 is an aluminum fork with vertical prongs 2101 that supports a smooth aluminum sample shaft 2101 in a horizontal position perpendicular to the probe. The lower fixture has a vertical post 2102 machined to fit its base of the tensile tester and also uses a locking collar 2103 to stabilize the fixture orthogonal to the upper fixture.

The sample shaft 2101 has a diameter that is 85% to 95% of the inner diameter of the roll and longer than the width of the roll. The ends of sample shaft are secured on the vertical prongs with a screw cap 2104 to prevent rotation of the shaft during testing. The height of the vertical prongs 2101 should be sufficient to assure that the test roll does not contact the horizontal base of the fork during testing. The horizontal distance between the prongs must exceed the length of the test roll.

Program the tensile tester to perform a compression test, collecting force and crosshead extension data at an acquisition rate of 100 Hz. Lower the crosshead at a rate of 10 mm/min until 5.00 g is detected at the load cell. Set the current crosshead position as the corrected gage length and zero the crosshead position. Begin data collection and lower the crosshead at a rate of 50 mm/min until the force reaches 10 N. Return the crosshead to the original gage length.

Remove all of the test rolls from their packaging and allow them to condition at about 23° C.±2 C° and about 50%±2% relative humidity for 2 hours prior to testing. Rolls with cores that are crushed, bent or damaged should not be tested. Insert sample shaft through the test roll's core and then mount the roll and shaft onto the lower stationary fixture. Secure the sample shaft to the vertical prongs then align the midpoint of the roll's width with the probe. Orient the test roll's tail seal so that it faces upward toward the probe. Rotate the roll 90 degrees toward the operator to align it for the initial compression.

Position the tip of the probe approximately 2 cm above the surface of the sample roll. Zero the crosshead position and load cell and start the tensile program. After the crosshead has returned to its starting position, rotate the roll toward the operator 120 degrees and in like fashion acquire a second measurement on the same sample roll.

From the resulting Force (N) verses Distance (mm) curves, read the penetration at 7.00 N as the Roll Firmness and record to the nearest 0.1 mm. In like fashion analyze a total of ten (10) replicate sample rolls. Calculate the arithmetic mean of the 20 values and report Roll Firmness to the nearest 0.1 mm.

In the interests of brevity and conciseness, any ranges of values set forth in this specification are to be construed as written description support for Claims reciting any sub-ranges having endpoints which are whole number values within the specified range in question. By way of a hypothetical illustrative example, a disclosure in this specification of a range of 1-5 shall be considered to support Claims to any of the following sub-ranges: 1-4; 1-3; 1-2; 2-5; 2-4; 2-3; 3-5; 3-4; and 4-5.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any example disclosed or Claimed herein or that it alone, or in any combination with any other reference or references, teaches, suggests or discloses any such example. Further, to the extent that any meaning or definition of a term in this document conflicts with any meaning or definition of the same term in a document incorporated by reference, the meaning or definition assigned to that term in this document shall govern.

While particular examples of the present disclosure have been illustrated and described, it would be obvious to those skilled in the art that various other changes and modifications can be made without departing from the spirit and scope of the present disclosure. It is therefore intended to cover in the appended Claims all such changes and modifications that are within the scope of this disclosure.

What is claimed is:

1. A fibrous structure comprising a plurality of wet-formed knuckles, wherein the wet-formed knuckles form a plurality of rows oriented in an X-direction and/or a Y-direction, and wherein the plurality of rows is curved in a repeating wave pattern, wherein the wave pattern has an amplitude and a wavelength, wherein the amplitude is between about 0.75 mm and about 3.0 mm, and the wavelength is between about 25.0 mm and about 125.0 mm, and wherein the fibrous structure has a TS7 of between about 0.01 dB $V^2$ rms and about 20.00 dB $V^2$ rms.

2. The fibrous structure of claim 1, wherein the wave pattern is a sinusoidal wave pattern.

3. The fibrous structure of claim 1, wherein the amplitude is between about 1.0 mm and about 2.5 mm.

4. The fibrous structure of claim 1, wherein the wavelength is between about 25.0 mm and about 75.0 mm.

5. The fibrous structure of claim 1, wherein an amplitude to wavelength ratio is between about 0.025 to about 0.05.

6. The fibrous structure of claim 1, wherein the plurality of wet-formed knuckles are characterized by:

1) the plurality of wet-formed knuckles within the pattern have substantially the same shape, and 2) at least two of the plurality of wet-formed knuckles within the pattern have varying size.

7. The fibrous structure of claim 1, wherein the fibrous structure has an SST (Slope of the Square Root of Time) rate of between about 1.60 g/sec$^{0.5}$ and about 2.50 g/sec$^{0.5}$.

8. The fibrous structure of claim 1, wherein the fibrous structure has a Plate Stiffness of between about 12 N*mm and about 20 N*mm.

9. The fibrous structure of claim 1, wherein the fibrous structure has a Resilient Bulk of between about 85.0 cm$^3$/g and about 110.0 cm$^3$/g.

10. The fibrous structure of claim 1, wherein the fibrous structure has a Total Wet Tensile of between about 400 g/in and about 900 g/in.

11. A fibrous structure comprising a plurality of wet-formed pillows, wherein the wet-formed pillows form a plurality of rows oriented in an X-direction and/or a Y-direction, and wherein the plurality of rows is curved in a repeating wave pattern, wherein the wave pattern has an amplitude and a wavelength, wherein the amplitude is between about 0.75 mm and about 3.0 mm, and the wavelength is between about 25.0 mm and about 125.0 mm, and wherein the fibrous structure has a TS7 of between about 0.01 dB $V^2$ rms and about 20.00 dB $V^2$ rms.

12. The fibrous structure of claim 11, wherein the wave pattern is a sinusoidal wave pattern.

13. The fibrous structure of claim 11, wherein the amplitude is between about 1.0 mm and about 2.5 mm.

14. The fibrous structure of claim 11, wherein the wavelength is between about 25.0 mm and about 75.0 mm.

15. The fibrous structure of claim 11, wherein an amplitude to wavelength ratio is between about 0.025 to about 0.05.

16. The fibrous structure of claim 11, wherein the fibrous structure has a TS7 of between about 0.01 dB $V^2$ rms and about 20.00 dB $V^2$ rms, and an SST rate of between about 1.60 g/sec$^{0.5}$ and about 2.50 g/sec$^{0.5}$.

17. The fibrous structure of claim 11, wherein the fibrous structure has a Plate Stiffness of between about 12 N*mm and about 20 N*mm.

18. The fibrous structure of claim 11, wherein the fibrous structure has a Resilient Bulk of between about 85.0 cm$^3$/g and about 110.0 cm$^3$/g.

19. The fibrous structure of claim 11, wherein the fibrous structure has a Total Wet Tensile of between about 400 g/in and about 900 g/in.

* * * * *